US011537984B2

(12) United States Patent
Butler et al.

(10) Patent No.: US 11,537,984 B2
(45) Date of Patent: *Dec. 27, 2022

(54) ADAPTIVE RFID INVENTORY SYSTEM

(71) Applicant: VenaResources, Inc., Pasadena, CA (US)

(72) Inventors: Jonathan Michael Butler, Gainesville, GA (US); Timm Sebastian Redder, Ladera Ranch, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/686,776

(22) Filed: Mar. 4, 2022

(65) Prior Publication Data

US 2022/0261743 A1    Aug. 18, 2022

Related U.S. Application Data

(63) Continuation of application No. 17/484,885, filed on Sep. 24, 2021, now Pat. No. 11,282,031.

(60) Provisional application No. 63/219,613, filed on Jul. 8, 2021, provisional application No. 63/149,016, filed on Feb. 12, 2021.

(51) Int. Cl.
| | |
|---|---|
| *G06Q 30/00* | (2012.01) |
| *G06Q 10/08* | (2012.01) |
| *G06K 19/07* | (2006.01) |
| *G06K 7/10* | (2006.01) |

(52) U.S. Cl.
CPC ....... *G06Q 10/087* (2013.01); *G06K 7/10128* (2013.01); *G06K 7/10227* (2013.01); *G06K 7/10366* (2013.01); *G06K 19/0723* (2013.01)

(58) Field of Classification Search
CPC .......... G06Q 10/087; G06K 7/10128; G06K 7/10227; G06K 7/10366; G06K 19/0723

USPC ........................................................ 235/385
See application file for complete search history.

(56) References Cited

U.S. PATENT DOCUMENTS

| | | |
|---|---|---|
| 10,140,486 B1 | 11/2018 | Lavery et al. |
| 11,282,031 B1 * | 3/2022 | Butler ............... G06K 19/0723 |
| 2013/0169414 A1 | 7/2013 | Bellows et al. |

(Continued)

OTHER PUBLICATIONS

International Search Report and the Written Opinion of the International Searching Authority for PCT/US2022/015964 dated May 20, 2022.

*Primary Examiner* — Ahshik Kim
(74) *Attorney, Agent, or Firm* — Womble Bond Dickinson (US) LLP

(57) ABSTRACT

An adaptive inventory management system for use in a materials handling facility storing a plurality of items that are each associated with a Radio Frequency Identification (RFID) tag. The management system including a global inventory database subsystem and a RFID interrogator subsystem comprising a plurality of RFID interrogators that are each configured to read the unique identifier of the RFID tag associated with each of the plurality of items that are within a defined boundary of at least one scan zone generated by the respective RFID interrogator and to communicate the unique identifier of the each scanned RFID tag identified within each scan zone of the respective RFID interrogator to the global inventory database subsystem. The management system being selectively configured to effect user desired levels of fidelity and/or resolution with respect to the generated unique identifier of the each scanned RFID tag within a defined space of the materials handling facility.

30 Claims, 19 Drawing Sheets

(56)  References Cited

U.S. PATENT DOCUMENTS

| | | |
|---|---|---|
| 2019/0026513 A1 | 1/2019 | Jones et al. |
| 2019/0163942 A1* | 5/2019 | Lavery .............. G06K 7/10376 |
| 2019/0325173 A1 | 10/2019 | Tingler et al. |
| 2021/0110689 A1 | 4/2021 | Allen |
| 2021/0279433 A1* | 9/2021 | Kan .................... H04B 5/0031 |
| 2021/0287506 A1* | 9/2021 | Clark .................. H01Q 1/2216 |

* cited by examiner

ADAPTIVE RFID INVENTORY SYSTEM

CROSS-REFERENCE TO RELATED APPLICATIONS

This application claims benefit of priority from U.S. Provisional Application No. 63/149,016, titled AN ADAPTIVE WAREHOUSE RFID INVENTORY SYSTEM, which was filed Feb. 12, 2021; U.S. Provisional Application No. 63/219,613, titled AN ADAPTIVE WAREHOUSE RFID INVENTORY SYSTEM, which was filed Jul. 8, 2021; and U.S. application Ser. No. 17/484,885, titled ADAPTIVE RFID INVENTORY SYSTEM, which was filed Sep. 24, 2021, all of the noted applications being hereby incorporated by reference. and.

TECHNICAL FIELD

The present disclosure relates generally to systems, apparatus and methods in the field of tracking items (e.g., an object, a package, a piece of equipment) and, more particularly, to various aspects involving systems, apparatus and methods for improved asset identification and location services using an adaptive, warehouse racking radio-frequency identification inventory system.

BACKGROUND

Supply chain management is utilized to manage the storage and movement of goods, including raw materials, work-in-process, and finished goods, from the point of origin to points of purchase or consumption. Reasons to accurately account for articles in a warehouse include tracking shipments from a bulk vendor, reduction of inventory for just-in-time manufacturing operations, reduction of shrinkage due to breakage and pilfering, managing claims against a manufacturer, and validating sales and other dispositions of articles. With continued growth and emphasis on efficiency of enterprises such as retail and warehousing operations, for both online commerce and physical brick-and-mortar stores, it is increasingly important to account for and track the actual inventory at each enterprise location in real time. The ability to identify an item and locate its whereabouts is a core competency for companies that use various forms of warehousing for product or part inventory. Companies typically invest in creating and maintaining a highly organized network for tracking its items, e.g., packages, objects, and the like, to lower costs and enhance operational efficiencies.

Conventionally, this identification and tracking function may be provided by a variety of known mechanisms and systems. Machine-readable barcodes are one way organizations keep track of items. In one example, in order to keep track of inventory, the operator typically scans or otherwise captures an image of the bar code on each item so that a back-end part of the operator's operation can keep track of what is coming in and leaving their warehouse. In addition, when an item is removed from the premises, the bar code for that item is scanned or captured to track inventory levels. Bar codes, however, have the disadvantage that personnel must manually scan each bar code on each item in order to effectively track the items.

Radio-frequency identification (RFID) tags are another known mechanism for tracking items. In contrast to barcodes, RFID tags do not usually require manual scanning. An RFID system typically includes an RFID reader and an RFID device such as a tag or label. The RFID reader transmits a Radio-Frequency ("RF") carrier signal to the RFID device. In operation, the RFID device may respond to the RF carrier signal (or interrogator signal) with a data response signal (or authentication reply signal) encoded with information stored on the RFID device. Conventionally, RFID devices may store information such as a unique identifier or an Electronic Product Code ("EPC") associated with an article or item.

To address these requirements, a system is needed that may monitor data regarding objects and efficiently extend visibility of such objects. Thus, there remains a need for an improved system that may provide more extensive and robust identification and tracking of items in a warehouse environment and to do so in a cost effective manner.

SUMMARY

To improve the state of the art, disclosed herein is a warehouse inventory management system, and methods of use thereof, utilizing novel functionalities. The system includes a global inventory database subsystem for cataloging a plurality of inventory items, each of the items identified by at least a unique identification code, such as an Electronic Product Code (EPC); and, a radio frequency identification (RFID) interrogator subsystem, the RF interrogator subsystem operative to read RFID tags associated with each of the plurality of inventory items, wherein each of the RFID tags is programmed with at least a unique identification code for its associated item. The disclosed system and methods provide functionality for improved single item identification/location, verification of shipping and receiving of a plurality of inventory items, and inventory operations utilizing a plurality of RFID interrogators mountable on warehouse racking assemblies. The warehouse inventory management system can also include a motion detection subsystem for detecting and identifying any inventory items moving from a first physical zone to a second physical zone. A disclosed system and method for simulating the operation of the warehouse inventory management system can be used to design and optimize the system.

In general, the disclosed methods for maintaining inventory data in a warehouse inventory management system include the functions of utilizing an RFID interrogator subsystem to read RFID tags associated with inventory items. Is such an exemplary system, the RFID interrogator subsystem can be configured to receive, from the global inventory database subsystem, at least one unique identification code for an item; scan the RFID tags of items contained at a physical location; and, report, to the global inventory database subsystem, whether the item associated with the at least one unique identification code is present in the warehouse and the physical location of the item. The RFID interrogator subsystem is further operable to receive a Shipping Notice (SN) from the global inventory database subsystem, wherein the SN identifies a plurality of new inventory items to be received at the warehouse; and, scan the RFID tags of all items contained in a shipment, whereby receipt of all expected items identified in the SN can be verified.

The RFID interrogator subsystem can be configured to selectively confirm when all items within the warehouse have been scanned and can be configured to send a report to the global inventory database subsystem that identifies at least one of the presence or absence of each of the plurality of items at the physical location. The physical location can be, for example, the position of the item on a rack of the warehouse rack assembly. Thus, it is contemplated that the report can cause the global inventory database subsystem to update the physical location of ones of the plurality of items scanned by the RF interrogator subsystem. As one skilled in the art will appreciate, the global inventory database subsystem can maintain at least one attribute for each of the plurality of inventory items.

An RFID interrogator subsystem can comprise a plurality of fixed RFID interrogators that are mounted to portions of a respective rack that is positioned in the warehouse. As one will appreciate, it is contemplated that a warehouse will comprise a plurality of racks that are positioned in an array throughout the warehouse floor space. The location of each of the plurality of fixed RFID interrogators for each rack has a known geospatial relationship that is stored within the global inventory database subsystem. Thus, the global inventory database subsystem knows the relative position of each of the plurality of fixed RFID interrogators for each rack and therefore also knows the relative positions of each of the plurality of fixed RFID interrogators for all the racks positioned in the warehouse. Optionally, the plurality of RFID interrogators forming the RFID interrogator subsystem can include at least one handheld RFID interrogator, each operative to share data associated with scanned items with the global inventory database subsystem.

Optionally, a plurality of RFID tags can be positioned on each respective rack in the warehouse. The rack mounted RFID tags are not associated with an inventory item, but rather are positioned on each of the respective racks in a known positional array that is stored with the global inventory database subsystem. It is contemplated that the combination of the known position of the respective fixed RFID interrogators on each rack and the known position of the respective rack mounted RFID tags on each rack will aid in positionally fixing the geospatial location of inventory items within the warehouse environment.

Optionally, it is contemplated that the plurality of RFID interrogators can be configured to share data associated with scanned items, the data including at least the unique identification code for each scanned item. Exemplarily, the data associated with scanned items can include the date and time of a scanning event so that the warehouse inventory management system can synchronize data associated with each inventory item received from different RFID interrogators. In some embodiments, the data is shared between RFID interrogators in real-time; the data can be directly shared between the RFID interrogators via a wireless connection or indirectly via the global inventory database subsystem.

The warehouse inventory management system can further comprise a motion detection subsystem, such as, for example, an infrared sensor, a microwave sensor, an ultrasonic sensor, or a video camera sensor. In one aspect, it is contemplated that a motion detection subsystem can be mountable in at least one of the fixed RFID interrogators that are mounted on the racks in the warehouse. In operation, the motion detection subsystem can be configured to detect movement within a region between a first physical zone and a second physical zone; enabling, in response to detecting movement, the RFID interrogator subsystem to identify any inventory items moving from the first physical zone to the second physical zone; and, reporting, to the global inventory database subsystem, the identity of each identified inventory item, whereby the global inventory database system can update the physical location of each item from the first physical zone to the second physical zone.

Optionally, it is contemplated that fixed RFID interrogators positioned therein the warehouse racks can be positioned such that their associated read zones are non-overlapping, e.g., a first fixed RFID interrogator in a first rack and a second fixed RFID interrogator in a second, nearby rack. In this operational scenario, movement of an item from a first physical zone proximate the first fixed RFID interrogator to a second physical zone proximate the second fixed RFID interrogator is indicated if the first fixed RFID interrogator reads an RFID tag of the item before the second fixed RFID interrogator, and from the second physical zone to the first physical zone if the second fixed RFID interrogator reads the RFID tag of the item before the first fixed RFID interrogator.

Optionally, and as described in detail herein, the adaptive inventory management system for use in a materials handling facility can include a plurality of receptacles, a global inventory management system, and an RFID interrogator subsystem. In this aspect, the plurality of receptacles, such as exemplified racks, can be configured to receive one or more items of a plurality of items, wherein each of the plurality of items is associated with a Radio Frequency Identification (RFID) tag. In this aspect, it is contemplated that each RFID tag stores a unique identifier as described herein.

Is this aspect, the global inventory database subsystem has a processing system having at least one memory of the processing system that is configured to store program instructions. The RFID interrogator subsystem includes a plurality of RFID interrogators and it is contemplated that at least one of the RFID interrogators can be mounted in a fixed geospatial location in the materials handling facility. Further, each of the RFID interrogators can be configured to read the unique identifier of the RFID tag associated with each of the plurality of items that are within a defined boundary of at least one scan zone generated by the respective RFID interrogator and to subsequently communicate the unique identifier of the each scanned RFID tag identified within each scan zone of the respective RFID interrogator to the processing system.

Thus, in operation, the at least one memory of the processing system can be configured to store program instructions that when executed cause the defined boundaries each scan zone for each RFID interrogators to be selectively configured to effect user desired levels of fidelity and/or resolution with respect to the generated unique identifier of the each scanned RFID tag within a defined space of the materials handling facility.

In optional aspects, the defined boundaries each of scan zone for each RFID interrogators can be configured such that boundaries of the respective RFID interrogators do not overlap or, alternatively or in combination, the defined boundaries each of scan zone for each RFID interrogator is user configurable such that at least portions of the defined boundaries of the respective RFID interrogators overlap with at least adjacent or otherwise selected RFID interrogators to define at least one overlapping scan zone. In this aspect, each overlapping scan zone and the associated RFID identifier data therefrom are created from RFID identifier data received from each scan of the respective scan zones of the respective selected RFID interrogators, and the RFID identifier data of the each scanned RFID tag identified within overlapping scan zone is communicated to the processing system.

It is further contemplated that, in operation, the scan zones projected by each RFID interrogators can be selectively configured to effect user desired levels of fidelity and/or resolution via the use of one or more configurable program options to include at least one of: changing the number of RFID interrogators to change the number of scan zones projected by the RFID interrogators within the defined space of the materials handling facility; changing the use of overlapping scan zones projected by the RFID interrogators within the defined space of the materials handling facility; changing the use of signal strength or phase shifting modalities within respective scan zones projected by the RFID interrogators within the defined space of the materials handling facility; changing the use of steerable antenna technologies in each RFID interrogator to create multiple spaced scan zones generated from each of the RFID interrogators within the defined space of the materials handling facility; or changing the use of steerable antenna technologies in the RFID interrogators within the defined space of the materials handling facility to create multiple overlapping scan zones from each of the RFID interrogators.

Thus, as described herein, it is contemplated that the user desired levels of fidelity and/or resolution can be selectively increased via the use of one or more configurable program options to include at least one of: increasing the number of RFID interrogators to increase the number of scan zones projected by the RFID interrogators within the defined space of the materials handling facility; increasing the use of overlapping scan zones projected by the RFID interrogators within the defined space of the materials handling facility; increasing the use of signal strength or phase shifting modalities within respective scan zones projected by the RFID interrogators within the defined space of the materials handling facility; increasing the use of steerable antenna technologies in each RFID interrogator to increase the number of created multiple spaced scan zones generated from each of the RFID interrogators within the defined space of the materials handling facility; or increasing the use of steerable antenna technologies in the RFID interrogators within the defined space of the materials handling facility to increase the number of created multiple overlapping scan zones from each of the RFID interrogators.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than can be necessary for a fundamental understanding of the exemplary embodiments discussed herein and the various ways in which they can be practiced. According to common practice, the various features of the drawings discussed below are not necessarily drawn to scale. Dimensions of various features and elements in the drawings can be expanded or reduced to more clearly illustrate the embodiments of the disclosure.

DETAILED DESCRIPTION

Figure 1:
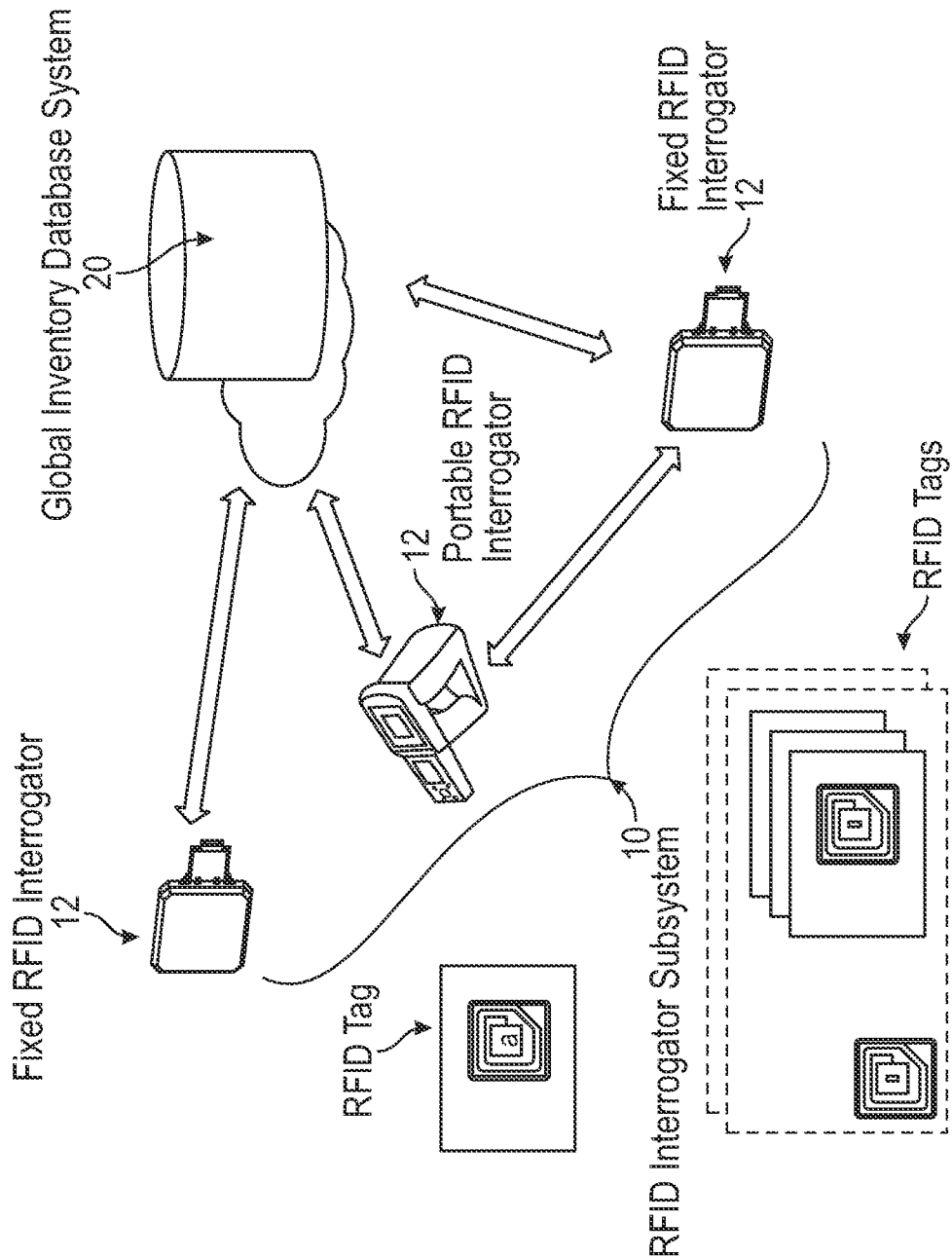
FIG. 1 schematically illustrates an example of a warehouse inventory management system.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a fixed RFID interrogator" can include two or more such fixed RFID interrogators unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutation of these cannot be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

With regards to the adaptive inventory management system described herein, two definitions are established for the respective terms "fidelity" and "resolution." Fidelity, as defined herein, refers to the respective and selective granularity with the result to the number and/or identification the RFID tags that are detected within a particular scanned zone or a particular defined space. Within the warehouse inventory management system, "fidelity" answers the basic question of: "what RFID tagged items are present in the scanned area," or, more particularly, "how many items and which specific items (according to associated RFID tags) are in a scanned zone or defined space." Resolution, as defined herein, refers to the respective and selective geo-spatial location of the RFID tags that are detected within a particular scanned zone or a particular defined space. Within the warehouse inventory management system, "resolution" answers the basic question of: "where are the RFID tagged items physically located within the scanned area," or, more particularly, "in which zone or defined space is a specific item (according to an associated RFID tag) physically located."

Radio frequency identification (RFID) systems utilize RFID reader/writer devices, also known as RFID interrogators, and RFID tags. Such systems can be used to locate and identify items to which the tags are attached; they are particularly useful in product-related industries for tracking inventory items through manufacture, distribution and sale. An RFID tag can be affixed to an individual product, its package, or a container for multiple products or packages.

An RFID tag typically includes an antenna section, a radio section, a power-management section, and frequently a non-volatile memory. Some RFID tags include an energy storage device, such as a battery. It is contemplated that the RFID tags used in a warehouse facility will be configured conventionally and, as such, will be passive tags that are typically powered solely by the RF signal they receive and will not include an energy storage device (e.g., a battery).

Conventional RFID inventory management techniques utilize an RFID interrogator to inventory one or more items having RFID tags, where inventorying involves at least singulating a tag and receiving a unique identifier from the tag. As used herein, "singulated" is defined as an RFID interrogator singling-out one tag, potentially from among multiple tags and "identifier" is defined as a number identifying the tag or the item to which the tag is attached, such as a tag identifier (TID) or an electronic product code (EPC). Conventionally, an RFID interrogator transmits a modulated RF command, receives a tag reply, and can, if desired, transmit an RF acknowledgement signal responsive to the tag reply. A tag that senses the interrogating RF wave responds by transmitting back another RF wave; the tag either generates the transmitted RF wave or reflects back a portion of the interrogating RF wave in a process known as backscatter. The reflected-back RF wave can encode data stored in the tag, such as the EPC. For example, the response is decoded by the RFID interrogator, and can thereby identify, count, or otherwise interact with the associated item. In one aspect, the decoded data can denote geospatial location of the item to which the RFID tag is attached or other desired attribute or status. The systems and methods described hereinafter make use of such data to improve the operation and use of warehouse inventory management systems.

In various embodiments, a warehouse inventory management system for a warehouse has a plurality of racks positioned in an array on a floor of the warehouse. The warehouse inventory management system has a global inventory database subsystem for cataloging a plurality of inventory items, each item being identified by at least a unique identification code and a physical location within the warehouse, and a radio frequency identification (RFID) interrogator subsystem operative to read RFID tags associated with each of the plurality of inventory items. The RFID interrogator system includes a plurality of fixed RFID interrogators mounted to portions of each rack in the warehouse that are configured to communicate at least location and identification data to the global inventory database subsystem for determination of the geospatial location of inventory items within the warehouse.

Figure 2:
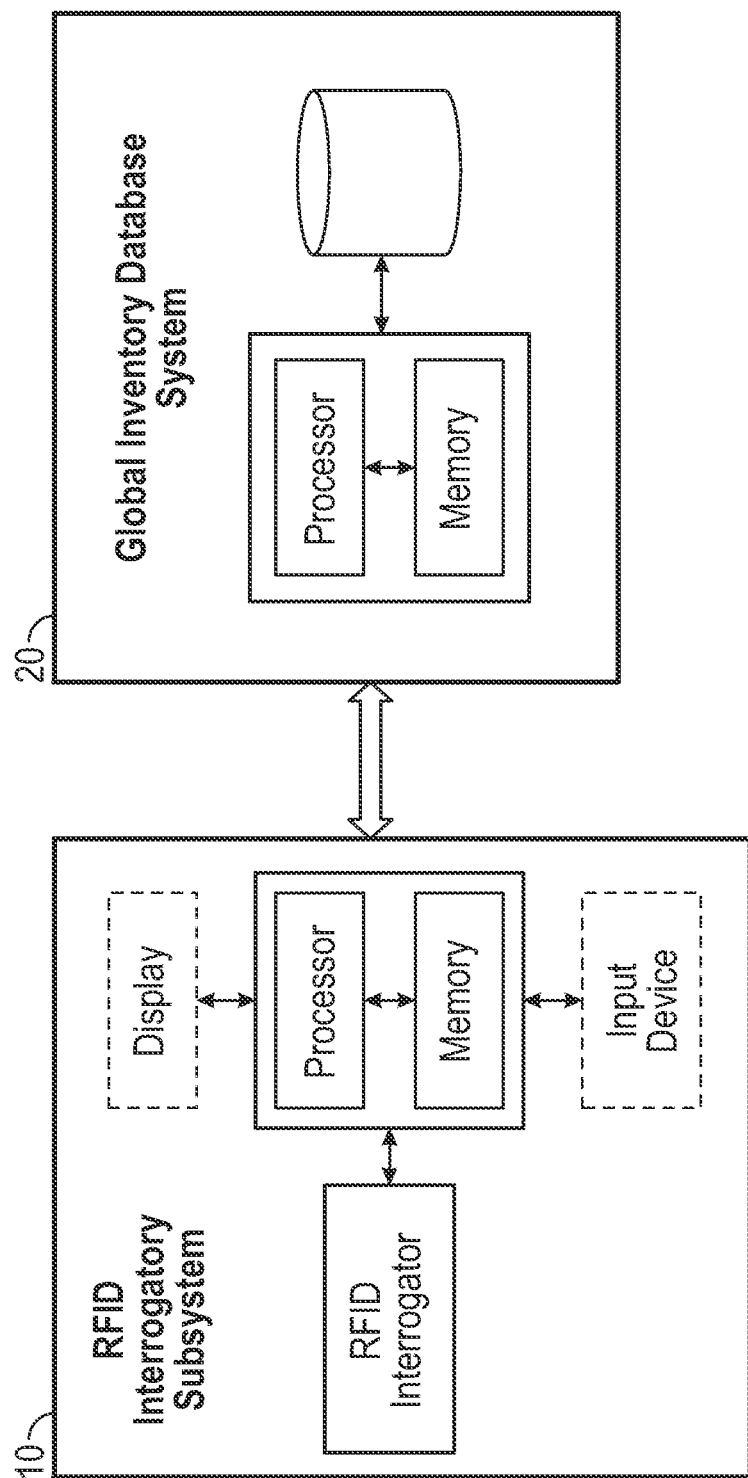
FIG. 2 schematically illustrates an example of an RFID interrogator subsystem and global inventory database subsystem of a warehouse inventory management system.
Figure 3:
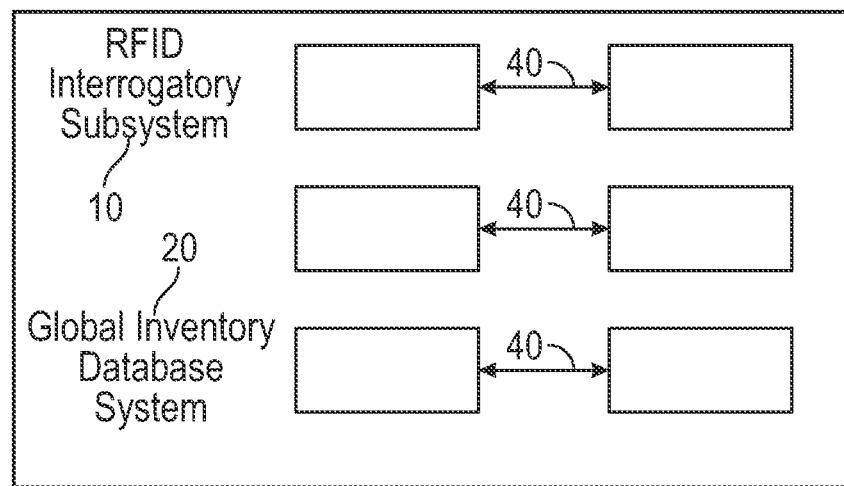
FIG. 3 schematically illustrates an example of a warehouse inventory management system; showing a plurality of conventional warehouse racks or H-racks positioned in an array on the floor of the facility or warehouse.

Turning now to FIGS. 1-3, an example warehouse inventory management system is shown that includes an RFID interrogator subsystem 10 and a global inventory database subsystem 20 for use in a warehouse. As one skilled in the art will appreciate, the global inventory database subsystem 20 (alternately referred to herein as a "server") can be local or remote; a remote location can be dedicated or cloud-based.

The RFID interrogator subsystem 10 can include a plurality of fixed RFID interrogators 12. Each fixed RFID interrogator has an interface to the global inventory database subsystem 20, which interface for a fixed RFID interrogator can be configured to be wired, wireless, or at least partially wireless (e.g., to a local router Wi-Fi router). As will be described more fully hereinafter, it is also contemplated that the RFID interrogators can also include a direct wireless connection for the sharing of certain data. Such a connection can be, for example, a Bluetooth® wireless connection. In operation, the RFID interrogators are configured to selectively interact with RFID tags contained on items (noting that it is contemplated that an RFID tag can be associated on an individual item, on boxes of items, and the like). Optionally, individual items or boxes of items having RFID tags can also be within a container having its own respective RFID tag. Optionally, the plurality of fixed RFID interrogators can include at least one handheld RFID interrogator, each operative to share data associated with scanned items with the global inventory database subsystem.

As shown in FIG. 2, the global inventory database subsystem 20 can include a processing system having at least one processor 22 and at least one memory 23, which can be coupled to a non-volatile memory containing a database 24 for cataloging information related to a plurality of inventory items; the memory contains instructions which, when executed by the processor, are operative to perform the essential, recommended and/or optional functions in various embodiments of the global inventory database subsystem described herein.

As illustrated in FIGS. 4-6 and 8-12, the exemplary RFID interrogator subsystem 10 can comprise a plurality of fixed RFID interrogators 12 that are mounted to portions of a respective rack 40 that is positioned in the warehouse. Exemplary racks 40 includes the illustrated conventional H-rack, but are not intended to be limited to be limited to such a H-rack. Rather, any conventional geospatially fixed position rack 40 can be utilized in the present warehouse inventory management system. As one will appreciate, and as shown in FIG. 3, it is contemplated that a warehouse will comprise a plurality of racks that are positioned in an array throughout the warehouse floor space. The geospatial location of each of the plurality of fixed RFID interrogators 12 for each rack has a known geospatial relationship that is stored within the global inventory database subsystem 20. Thus, the global inventory database subsystem knows the relative position of each of the plurality of fixed RFID interrogators 12 for each respective rack 40 and therefore also knows the relative positions of each of the plurality of fixed RFID interrogators 12 for all the racks 40 positioned in the warehouse. The exemplary RFID interrogator subsystem 10 can further comprise at least one hub that is configured to act as a network node, which is configured to relay information to and from the individual each fixed RFID interrogator device 12 to the global inventory database subsystem 20. In one exemplary aspect, the fixed RFID interrogator device 12 can communicate wirelessly with the hub, and the hub can then communicate to the global inventory database subsystem 20. either by Ethernet, Wi-Fi, cellular, or the like.

Figure 13:
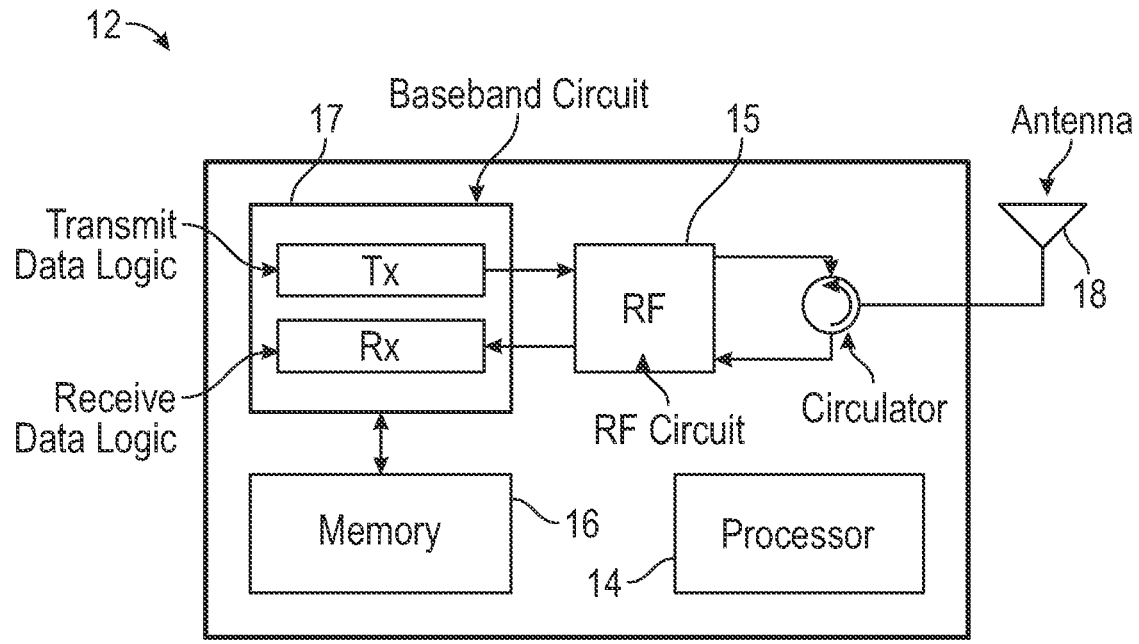
FIG. 13 schematically illustrates an example of a fixed RFID interrogator.

It is contemplated that each fixed RFID interrogator device 12 (e.g., the RFID interrogator device shown in FIG. 13) of the RFID interrogator subsystem 10 can individually have a processing system having at least one processor 14 and at least one memory 16, a baseband circuit 17 with transmitter TX and receiver RX, and an RF circuit 15 with circulator, which are coupled to an antenna 18 for interacting with RFID tags affixed to items, boxes or containers. Optionally, the antenna 18 can be configured to be interchangeable or replaceable to allow for operator selective scanning zones for a respective fixed RFID interrogator device 12. It is further contemplated that the memory 16 can contain instructions which, when executed by the processor 14, are operative to perform the essential and optional functions of the RFID interrogators 12 described herein.

Optionally, each fixed RFID interrogator device 12 can be configured to further include circuitry or components, e.g., a phase shifter, that are configured to change the inductance of the antenna 18, thereby causing a phase of an electromagnetic field emitted by the antenna 18 to vary with respect to its length. Because the strength of an RFID signal emitted by an RFID tag within the presence of an electromagnetic field is typically dependent upon the strength of the electromagnetic field, varying the phase of the electromagnetic field at various intervals of time, e.g., by phase angles of up to ninety degrees (90°) or one hundred eighty degrees (180°) in either direction with respect to a length of the antenna 18 at predetermined intervals, increases the likelihood that RFID signals of sufficient strength will be transmitted by RFID tags borne by each of the items positioned on the respective racks in the warehouse within a predefined range of antenna 18, regardless of where the RFID tag is located.

For example, shifting a phase of a rectified standing wave of an electromagnetic field back and forth with respect to the length of antenna 18 can cause points of peak amplitude and points of minimum amplitude (e.g., peaks and valleys) of the rectified standing wave to move along the length of antenna 18, ensuring that points where the strength of the electromagnetic field is at a minimum, e.g., points of minimum amplitude of the rectified standing wave, never remain in the same place rack for an extended duration, and that every RFID tag positioned on the respective racks in the warehouse within a predefined range of antenna 18 experiences a sufficiently strong electromagnetic field to cause an RFID signal to be emitted thereby. Thus, where a strength of an RFID signal transmitted by an RFID tag to an antenna 18 remains above a threshold or limit for a predetermined period of time, an item bearing the RFID tag can be determined to be located on a rack provided within the predefined range of the antenna 18. Varying the phase of the electromagnetic field may also enable user selectable levels of fidelity and or resolution for an item bearing an RFID tag on a support bar or arm to be determined or predicted based on the strengths of RFID signals received from the RFID tag.

Optionally, each fixed RFID interrogator device 12 can be configured to further include circuitry or components, e.g., an antenna azimuth shifter, that are configured to change relative scanned angular orientation or azimuth of the antenna 18, thereby causing the electromagnetic field emitted by the antenna 18 to propagate along the changed azimuth axis of the antenna. Varying the azimuth of the electromagnetic field may also enable user selectable levels of fidelity and or resolution for an item bearing an RFID tag on a support bar or arm to be determined or predicted based on the RFID signals received from the RFID tag from the use of iterated azimuth readings received from a single RFID interrogator.

Figure 4:
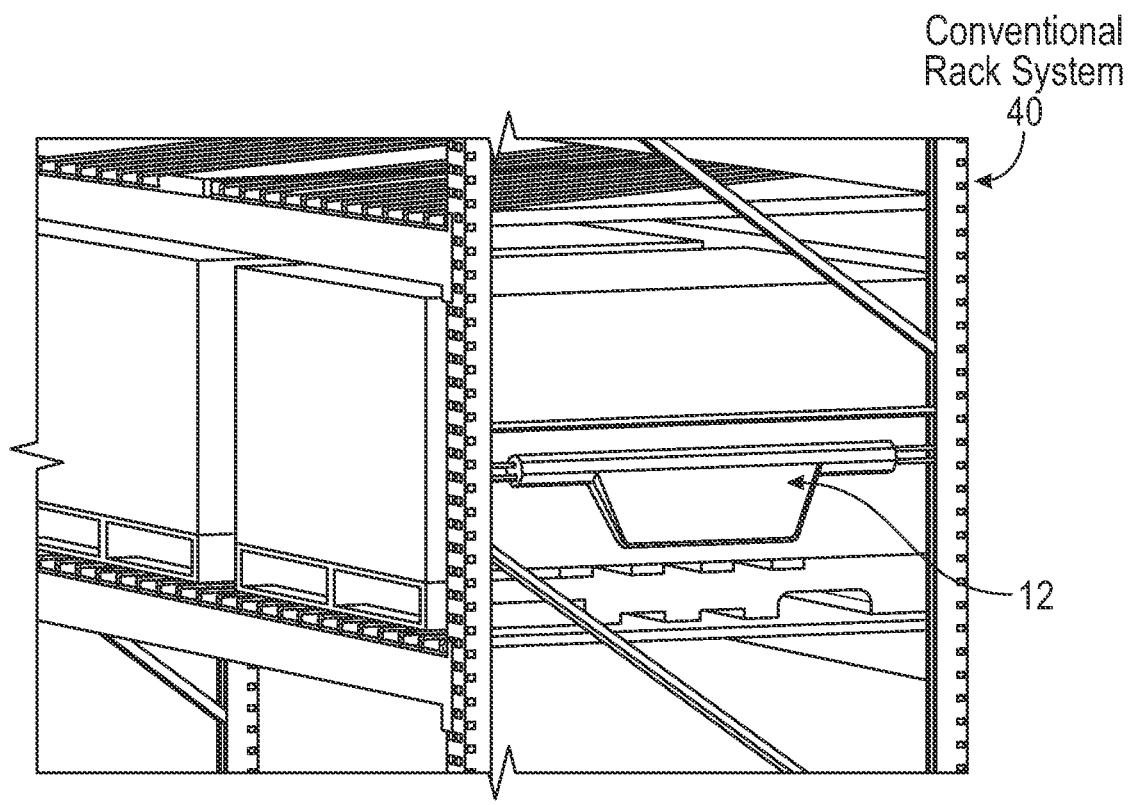
FIG. 4 schematically illustrates a first embodiment of a fixed RFID interrogator positioned in a conventional warehouse H-rack.
Figure 5:
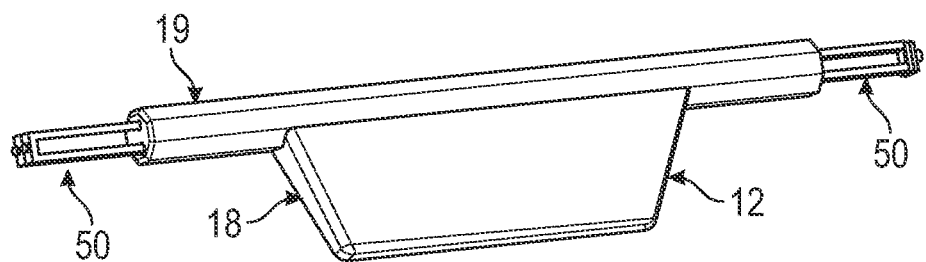
FIG. 5 is an expanded schematic view of the fixed RFID interrogator of FIG. 4 positioned in a conventional warehouse rack.
Figure 6:
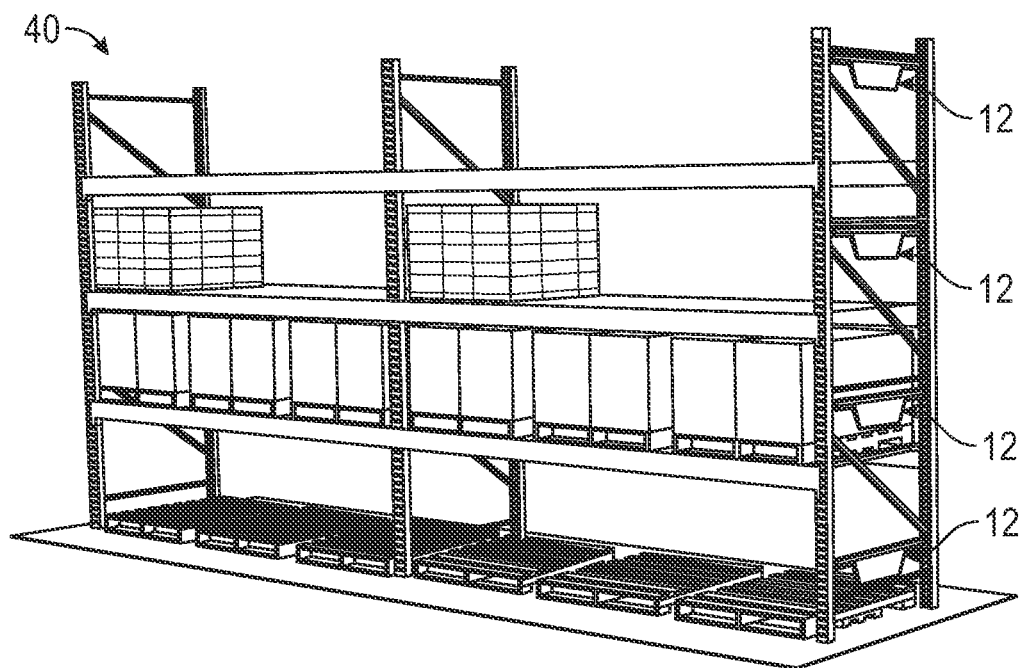
FIG. 6 schematically illustrates a plurality of the fixed RFID interrogators of FIG. 4 positioned in a conventional warehouse H-rack.

In various aspects, each fixed RFID interrogator device 12 of the RFID interrogator subsystem 10 can further include a frame that is configured to support the antenna 18 and the associated processing system. Such frame can be housed within a durable plastic housing 19 for protection and RF transparency. Further, as illustrated in FIGS. 4-6, each fixed RFID interrogator can further comprise a rail system 50 that is coupled to the frame and which is, for example, configured to be selectively coupled to the teardrop openings that are present in opposing vertical risers of conventional industry rack systems. As one will appreciate, it is contemplated that the rail system could be fixed to the conventional racks via mechanical connections that would accommodate various brands of racks and their openings. Further, different lengths of arms or adjustable arms for different depths of racking, or the system could mount to one vertical riser of the conventional industry rack systems as shown in FIGS. 8-12.

In an optional aspect, not illustrated herein, the fixed RFID interrogator device 12 can be mounted to the underside of the wire decking of the conventional rack system to allow for a "look up" or "look down" orientation of the interrogator antenna 18. For example, in this aspect, the fixed RFID interrogator device 12 can be mounted to the underside of the wire decking in the space spaced defined between the crossbeams of the rack such that the mounted fixed RFID interrogator device 12 would be out of the way of stored inventory.

It is contemplated that each fixed RFID interrogator device 12 can be configured to operate from battery power or optional standard mains power, which allows the possibilities of using the system in remote locations where standard power is not available. As one will appreciate, battery operated RFID interrogator devices would make power drops unnecessary, and the contemplated use of Wi-Fi, Bluetooth and cellular technologies would eliminate cable runs, which allows for simple installation and reconfiguration of the system. In one optional aspect shown in FIG. 12, a plurality of fixed RFID interrogators being mounted to one vertical riser of a conventional industry rack can be electrically coupled in a daisy-chain manner to allow for serial communication of electrical power to the mounted fixed RFID interrogators. As further exemplarily illustrated, the plurality of electrically coupled fixed RFID interrogators can further be configured to be electrically coupled to a source of main and/or battery power.

Figure 7:
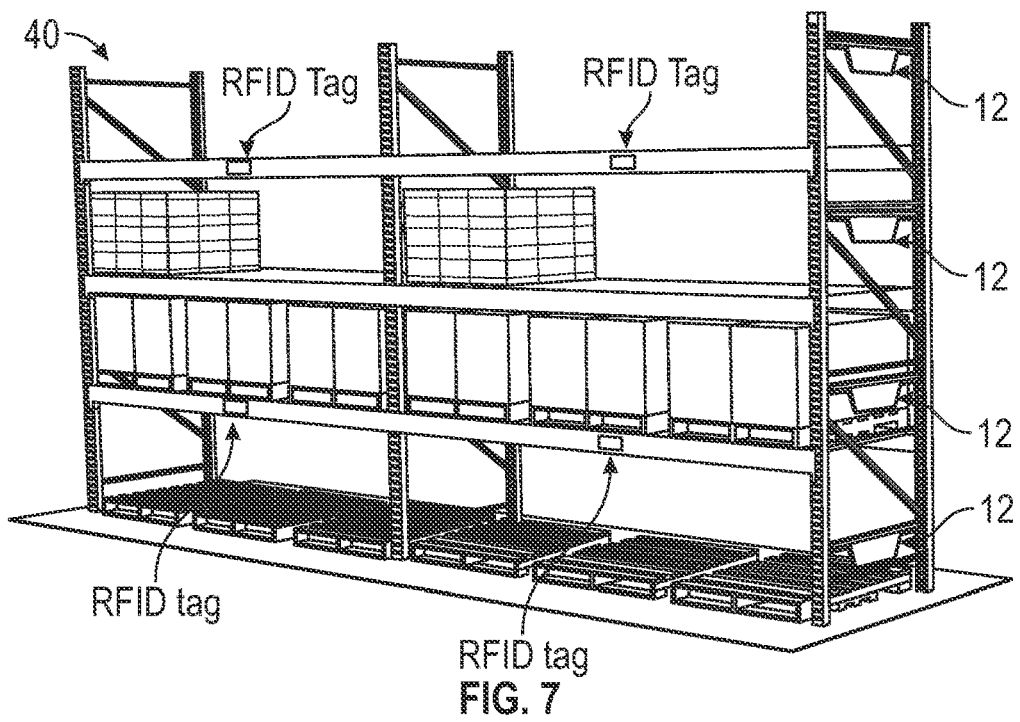
FIG. 7 schematically illustrates the plurality of fixed RFID interrogators of FIG. 6 and a plurality of rack-mounted RFID tags positioned in conventional warehouse racks.
Figure 8:
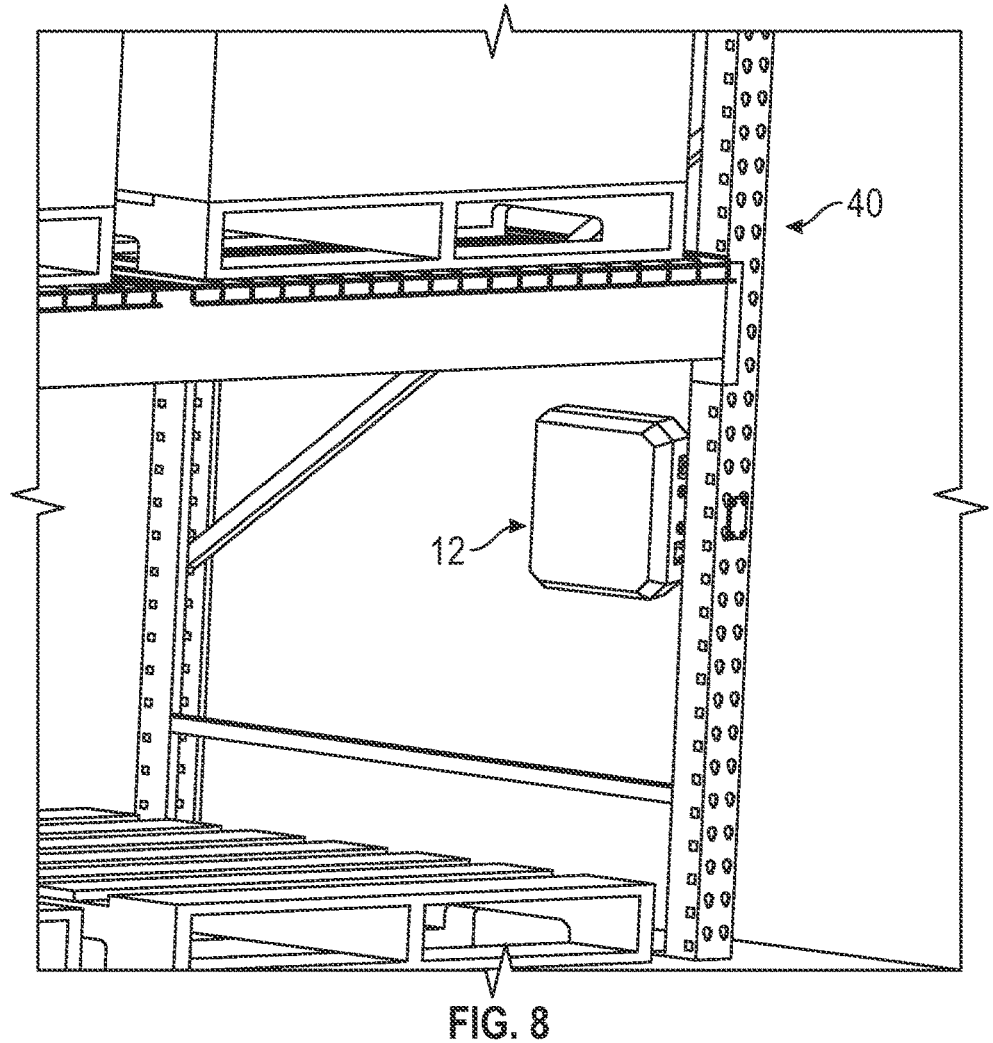
FIG. 8 schematically illustrates a second exemplary embodiment of a fixed RFID interrogator positioned in a conventional warehouse H-rack.
Figure 9:
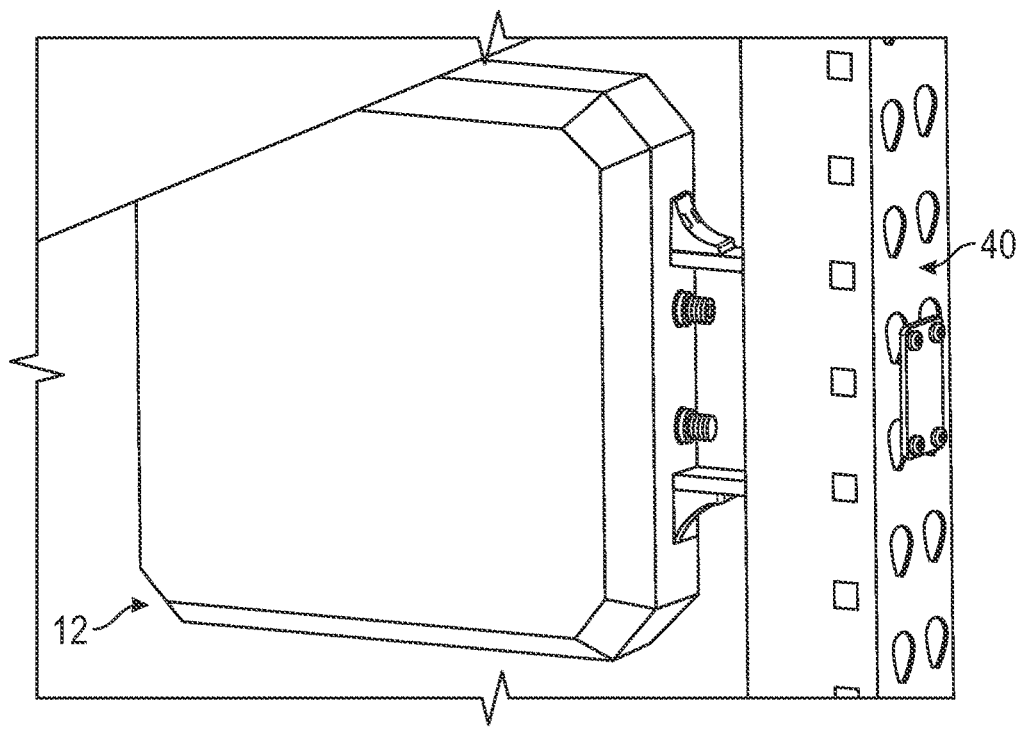
FIG. 9 is an expanded schematic view of the fixed RFID interrogator of FIG. 8 positioned in a conventional warehouse rack.
Figure 10:
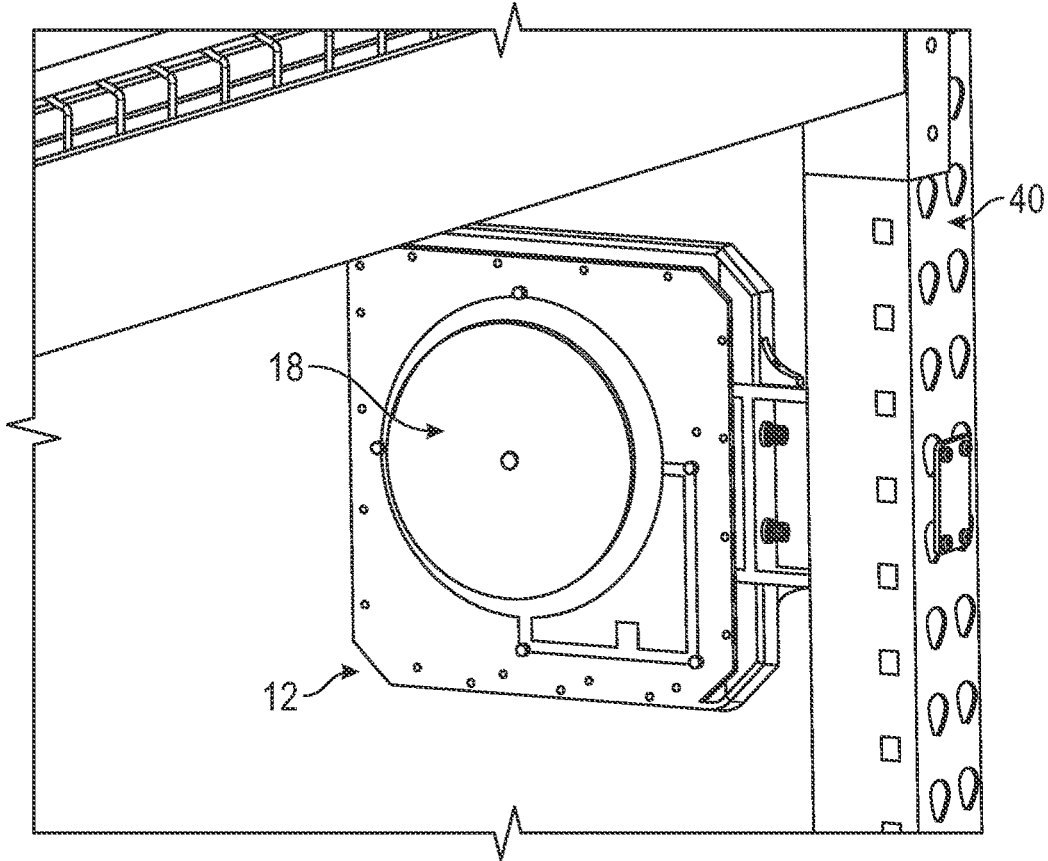
FIG. 10 is an expanded schematic view of the fixed RFID interrogator of FIG. 9 positioned in a conventional warehouse rack, showing a portion of the cover removed to display a portion of an antenna.
Figure 11:
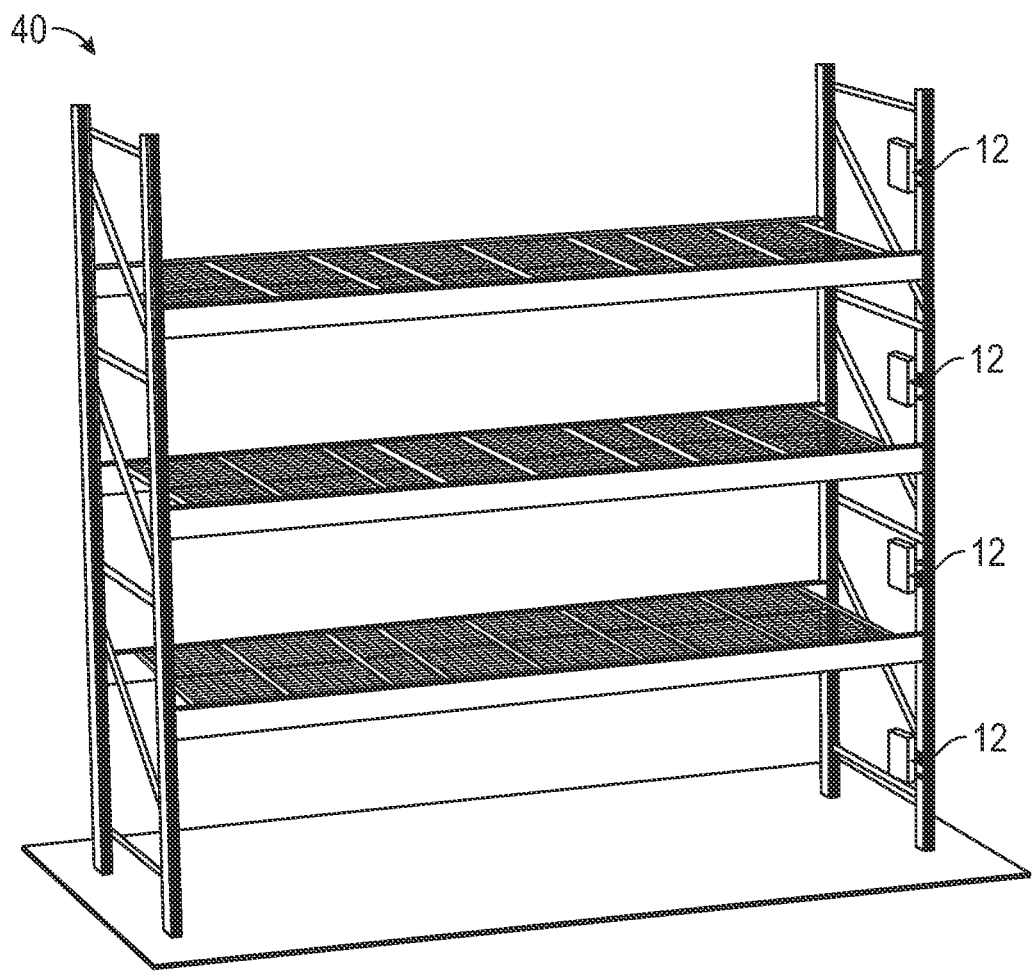
FIG. 11 schematically illustrates a plurality of the fixed RFID interrogators of FIG. 8 positioned in a conventional warehouse H-rack.
Figure 12:
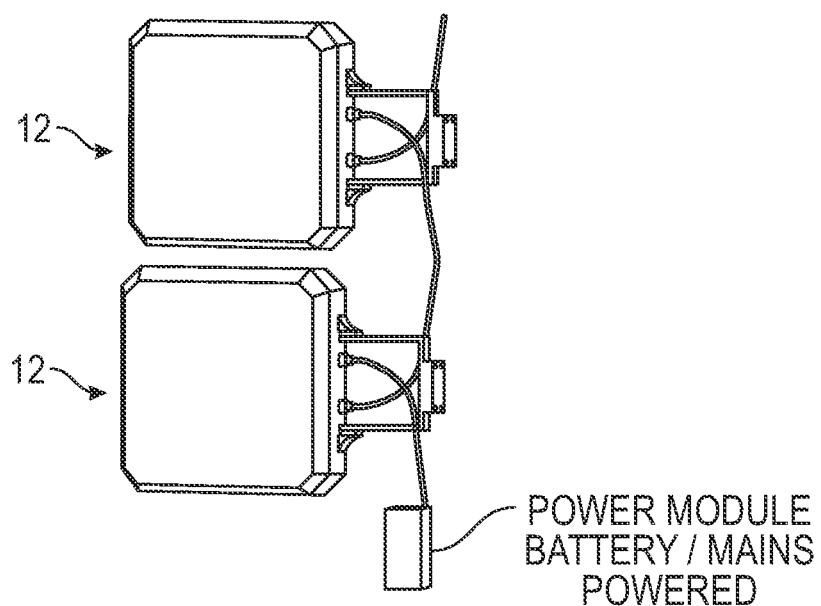
FIG. 12 schematically illustrates a fixed RFID interrogators of FIG. 8 being coupled in a daisy-chain manner to serially communicate power to connected fixed RFID interrogators, and showing the plurality of electrically coupled fixed RFID interrogators being further electrically coupled to a source of main and/or battery power.

Optionally, and as shown in FIG. 7, it is contemplated that the warehouse inventory management system can further include a plurality of RFID tags positioned on each respective rack in the warehouse. The rack mounted RFID tags are not intended to be associated with a respective inventory item, but rather are positioned on each of the respective racks in a known positional array that is stored with the global inventory database subsystem. It is contemplated that the combination of the known position of the respective fixed RFID interrogators on each rack and the known position of the respective rack mounted RFID tags on each rack will aid in positionally fixing and/or increasing the fidelity of the geospatial location of inventory items within the warehouse environment.

In a warehouse (also referred to as a "distribution center"), an inventory management system must perform many functions, including receiving, inbound auditing, pick processing, pack auditing, and shipping verification. Upon receiving a shipment, an RFID interrogator can read an RFID tag on each container, or RFID tags of each item in a container, to be checked against an advance shipping notice ("SN"); discrepancies between what is received and the SN can be reported to the inventory management system.

As described supra, the global inventory database subsystem 20 catalogs all inventory items within a warehouse, and can generate an SN, identifying one or more items, each by a unique identification code. The RFID interrogator subsystem 10 then is used to scan the RFID tags of items contained within the warehouse or a desired selected portion of the warehouse. Following the scanning of items, a report can be sent to the global inventory database system, identifying which items were identified/counted and the physical location of the respective items within the warehouse.

In various aspects, the fixed RFID interrogators can share data associated with scanned items, either directly or indirectly. A direct wireless connection can be, for example, a Bluetooth® wireless connection. Alternatively, or additionally, each fixed RFID interrogator can share data indirectly through the global inventory database subsystem 20 by the immediate reporting of each scanned item, which can then be pushed to, or pulled by, another fixed RFID interrogator. The shared data includes at least the unique identification code for each scanned item; the geospatial location data associated with each scanned item to include the date and time of a scanning event, whereby the warehouse inventory management system can synchronize data associated with each inventory item received from different fixed RFID interrogators. For example, the global inventory database subsystem 20 should maintain at least the most recent location, together with the date and time; in some embodiments, maintaining a record of data from all scanning events can be helpful for inventory management or determining the basis for discrepancies. One skilled in the art will appreciate that maintaining a time based record of the scanned items can be used to create a history of an item's movement through a warehouse. This time based record can be used to process inventory bottlenecks, identify aging or perishable inventory, alert operators of pilfered items and the like.

The warehouse inventory management system 10 can further comprise a motion detection subsystem, such as, for example, an infrared sensor, a microwave sensor, an ultrasonic sensor, or a video camera sensor that is in communication with the global inventory database subsystem 20. In one aspect, it is contemplated that a motion detection subsystem can be mountable in at least one of the fixed RFID interrogators that are mounted on the racks in the warehouse. Optionally, the motion detection subsystem can be mountable as desired in the warehouse space, e.g., proximate door entrances, and the like. In operation, the motion detection subsystem can be configured to detect movement within a region between a first physical zone and a second physical zone; enabling, in response to detecting movement, the RFID interrogator subsystem to identify inventory items moving from the first physical zone to the second physical zone; and, reporting, to the global inventory database subsystem, the identity of each identified inventory item, whereby the global inventory database system can update the physical location of each item from the first physical zone to the second physical zone. As used herein, "enabled" or "enabling" means to either activate the RFID interrogator subsystem (if generally inactivated) or to allow it to interrogate RFID tags (if generally activated). Once activated or otherwise allowed to interrogate RFID tags, the RFID interrogator subsystem identifies inventory item(s) moving from the first physical zone to the second physical zone; the identity of such items are then reported to the global inventory database subsystem, which can then update the location of each inventory item moved between the physical zones.

As described, the global inventory database subsystem 20 can be configured to activate a scan, or to prevent a scan, depending on the need and or event triggered by the motion detection subsystem. In various examples, and not meant to be limiting, motion detected at a back door proximate a motion detection sensor, can trigger a scan for theft, or general movement in the warehouse sensed by the motion detection subsystem could suggest that an item is being moved.

It is also contemplated that the global inventory database subsystem 20 can be configured to use timers to trigger scans, push commands from a user, or other such combination.

Optionally, it is contemplated that fixed RFID interrogators 12 positioned therein the warehouse racks can be positioned such that their associated read zones are non-overlapping, e.g., the read zones of a first fixed RFID interrogator in a first rack non-overlapping with the read zones of a second fixed RFID interrogator in a second, nearby rack. In this operational scenario, movement of an item from a first physical zone proximate the first fixed RFID interrogator to a second physical zone proximate the second fixed RFID interrogator is indicated if the first fixed RFID interrogator reads an RFID tag of the item before the second fixed RFID interrogator, and from the second physical zone to the first physical zone if the second fixed RFID interrogator reads the RFID tag of the item before the first fixed RFID interrogator.

Still further, it is optionally contemplated that fixed RFID interrogators 12 positioned therein the warehouse racks can be positioned such that their associated read zones are positioned to purposefully overlap, e.g., a plurality of fixed RFID interrogators configured to have overlapping read zones. In this example, if an item is registered in all three of the overlapping read zones, the item must be in a very precise geo-spatial region. However, if the item is registered in only two of the three overlapping read zones, the item must be a different but specific geo-spatial region, and if the item is registered in only one of the three overlapping read zones, the item must be a yet another different but specific geo-spatial region.

The exemplary warehouse inventory management system can be configured to address multiple types of businesses. As one will appreciate, every business has slightly different needs and expectations, and the warehouse inventory management system is configured to be adaptable to address the respective business needs and expectations as they change over time.

An exemplary methodology in configuring the warehouse inventory management system to meet the requirements of the user can include an initial step of completing a site assessment. In this phase, the user can identify the expected outcomes of the warehouse inventory management system and take into account at least one of the business, technological, IT, facility, and HR factors. This site assessment step can involve the development of a customer installation plan that can identify key factors, can describe the installation requirements, and/or can provides an invoice bill of material for ordering hardware.

In the site assessment step, it is desired to identify the particulars of the items that the business wants to be tagged and tracked. In one non-limiting example, knowing at least one of the quantity, density, transit speed, physical composition, and environmental context of the intended tracked items can help in determining the appropriate RDID tag to attach to the items.

It is further desired to identify the intended monitored space in the site assessment step. Identifying the intended monitored space allows for the determination of the physical and radio frequency (RF) characteristics of the space to be monitored (to include determining potential RF interference so that background noise levels that could interfere with RF technology scanning can be identified), along with at least one user-defined zones within each space. In this aspect, a zone is a location that warehouse inventory management system will report as a location for an item. As one will appreciate, the number and size of various zones can determine the amount of RFID interrogators 12 and hubs that would needed to build out the warehouse inventory management system to meet the respective business' operational needs.

In this site assessment step, the warehouse inventory management system can also determine the users and their profiles. The warehouse inventory management system can be configured to allow for controlled access to data and this can be set up with permission roles for different users, which allows for different users to have different visibility/access within the warehouse inventory management system 10.

In a subsequent installation step, the required hardware, i.e., devices and systems supporting the exemplary RFID interrogator subsystem 10 and the global inventory database subsystem 20 is installed at the facility locations according to the customer installation plan. For example, fixed RFID interrogator devices 12 and hubs can be positioned at desired locations with facility with the intent of having the exemplary RFID interrogator subsystem 10 presenting low visibility and minimal impact. This allows for the mitigation of damage to system component and can aid in eliminating potential equipment interference to the normal functions of the business.

Further in the installation step, the exemplary RFID interrogator subsystem 10 and the global inventory database subsystem 20 is configured and the hardware is brought online. The fixed RFID interrogator devices 12 and hubs are all configured and operationally tested. In one non-limiting aspect, because it is contemplated that the exemplary warehouse inventory management system will be a browser based application, the warehouse inventory management system would not require a device-level installation.

In a subsequent user configuration step, the client or site can be created within the warehouse inventory management system and then subsequent users can be created to provide access to the data. It is contemplated that in this user configuration step, the user will log into the warehouse inventory management system and identify the product/item/asset category and the warehouse inventory management system will automatically provide the naming templates, which can be user customizable. In operation, the user will provide the necessary information and enter in the templates and, when data entry is completed and confirmed for accuracy, the warehouse inventory management system will create an electronic product code (epc) and associate all data entry to this epc within a secure database. Further, it is contemplated that a printer can then be used to print a RF-enabled tag with the epc coded into its internal circuitry. It is further contemplated that optionally additional human readable item information (bar code optional) can be printed on the label. Conventional RF printers can print ink-based data on the RF-enabled tag for a user to read, but can also rewrite a RF-enabled tag with custom data.

In a tracking sub-step of the user configuration step, the user applies a label to an item and, subsequently, if the labeled item is positioned within at least one of the warehouse inventory management system zones and a scan is initiated the warehouse inventory management system will report back the location and time stamp of the item. In various exemplary aspects, labels can be integrated into containers, pouches, etc. and be re-used and recoded, and, depending on range and tracking resolution required, active tags can be used by the warehouse inventory management system.

Optionally, in a system functionality step, scan zones can be created or otherwise configured to differentiate between ambient storage and cold storage. Exemplarily, RFID interrogator devices 12 can be placed above and/or on the sides of entry/exit points to track items entering or leaving a building/facility. Optionally, the RFID interrogator devices 12 can be motion or event activated. It is further contemplated that the warehouse inventory management system can be configured to allow for the conduct of scans by the on a recurring or otherwise identified timeline or schedule.

In a further optional aspect, in the system functionality step, scan zones can be created by the exemplary RFID interrogator subsystem 10 and the global inventory database subsystem 20. As described herein, it is contemplated that scan zones can be configured to be user-customizable. For example, scan zones can be created or otherwise configured for desired fidelity and/or resolution via the use of one or more configurable options to include at least one of: increasing/decreasing numbers of RFID interrogator devices 12 within the defined warehouse space, increasing/decreasing the use of multiple scanned zones and or multiple overlapping scanned zones; increasing/decreasing the use of signal strength or phase shifting modalities within a respective scan zone; and/or increasing/decreasing the use of steerable antenna technologies in the RFID interrogator devices 12 to create multiple scanned zones from each of the RFID interrogator devices 12.

As described above, it is contemplated that the resolution and fidelity of the warehouse inventory management system can be modified and/or upgraded as desired by the user. The addition of additional RFID interrogator devices 12 and/or the use of overlapping zones, which allows for sensing of an item by two or more RFID interrogator devices 12, within the user's configured warehouse inventory management system can allow for a user inputted increase in the fidelity and/or resolution of the particular identified item.

In one additional optional aspect, it is contemplated that the user can modify the configuration settings of the system to achieve a desired degree of fidelity and/or resolution for a given warehouse space and a given, fixed number of RFID interrogator devices 12.

In one aspect the warehouse inventory management system, and more particularly the global inventory database subsystem 20, includes a system operation process ("SOP") 25 that is described below in detail, with both intended and optional systems. Various system and process embodiments of the SOP 25 with various combinations of above and below-described features are considered within the scope of the present disclosure.

The intent of SOP 25 in the global inventory database subsystem 20 is to provide a means to track, locate, aggregate, and communicate inventory, assets, or objects within some defined space. There are many intended users for such a process 25, and the SOP 25 provides for user selectable customizable solution(s) as the company's warehouse consumable needs change over time.

Figure 14:
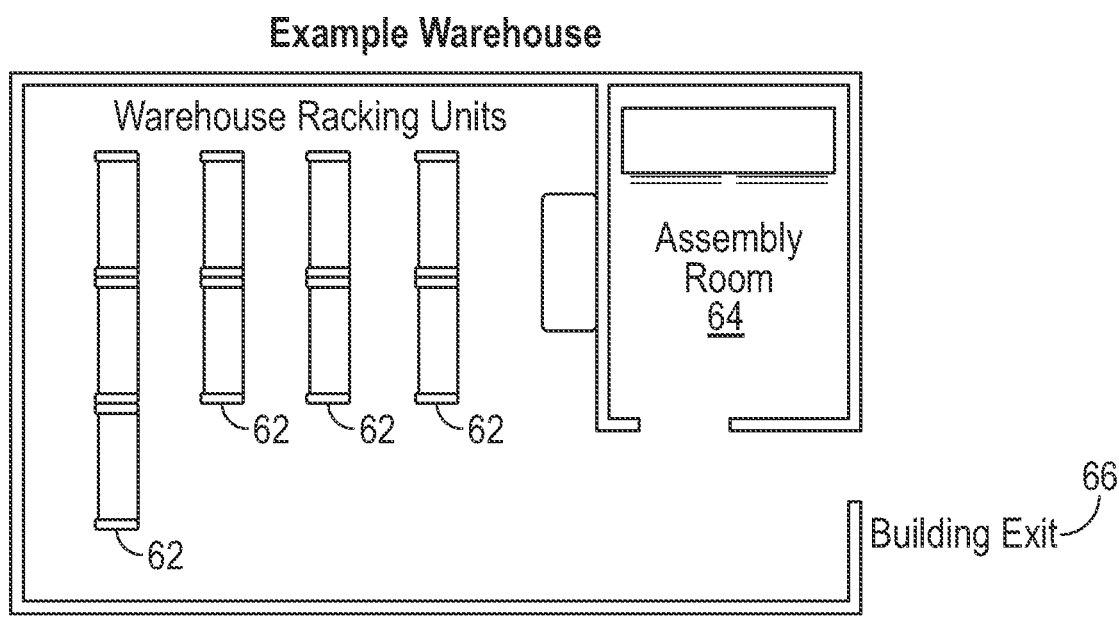
FIG. 14 illustrates an example warehouse floorplan.

The SOP process, in one embodiment, starts with defining the area or site that needs to be monitored. In an example case, the area or site could be a warehouse. However, the area or site could be a livestock barn, a lumberyard, an airport, a retail space, a manufacturing facility, laboratory, hospital, semi-truck, and the like. This defining step typically involves creating a map or floorplan of the space. FIG. 14 shows an example warehouse floorplan.

As shown, a warehouse 60 exemplarily has racking units 62, an assembly room 64 and a building exit 66. The next step is to break up this site into zones. Zones are locations or areas within the site that can be named and identified. Zones, and locations within zones, can be as granular as needed. If the user need is to provide very precise locations, then more zones would be optionally created as described herein. Zones can also overlap to eliminate dead spots as needed or to increase the desired level of fidelity and/or resolution of the system. In the illustrated example, the warehouse 60 has several warehouse storage racking units 62 with multiple shelves on each rack, it has an exit 66, and it has an assembly room 54 that all need to be zoned.

Figure 15:
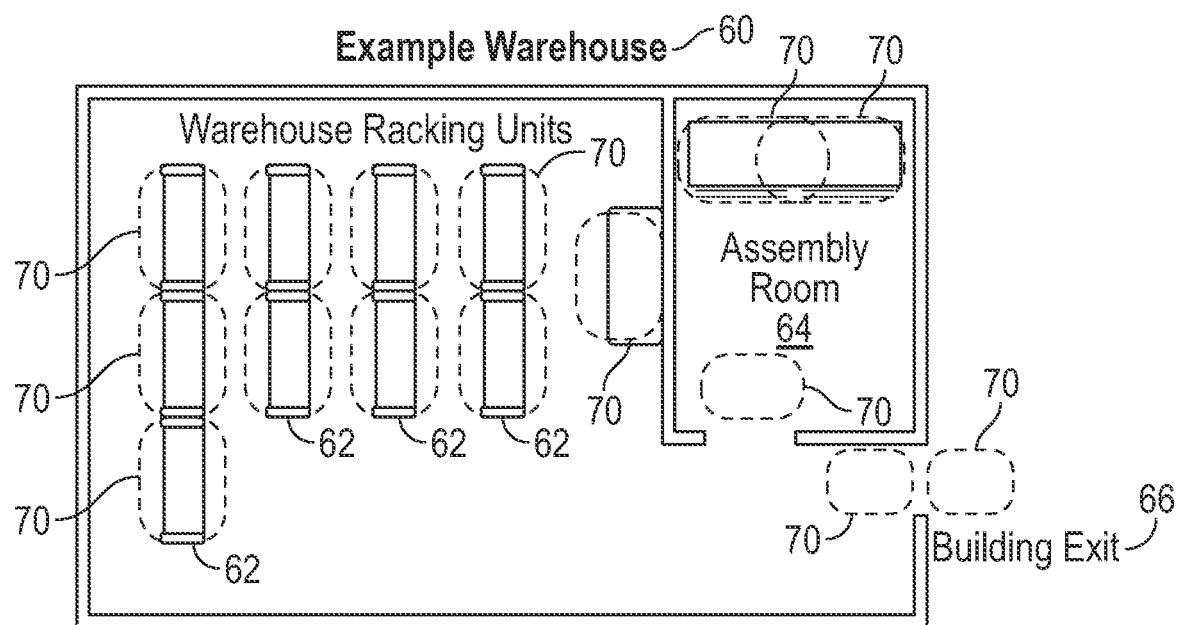
FIG. 15 illustrates example scan zones in the example warehouse of FIG. 14.

FIG. 15 illustrates exemplary intended zones 70 (shown as dashed lines) that are defined relative to locations and fixtures in the warehouse 60. At this point in one embodiment process, zones can be named a user-friendly name or something that has meaning to the user, and this information is loaded into the software application of the global inventory database subsystem 20.

Exemplarily shown, the warehouse space has a zone 70 or multiple zones 70 for each racking unit 52, the entrance to the assembly room 64, the assembly room 64 with two overlapping zones 70, and the exit 66 having internal and external zones 70. Having a zone 70 at a doorway allows for monitoring of items coming or going through the doorway entrance. In this aspect, having two zones 70 at a doorway could be used to monitor the direction of travel of the RFID identified object, e.g., did the item leave or enter the warehouse? This is a simplified exemplary aspect but the system can be selectively configured to be much more granular in analysis, as desired, to provide for a higher resolution and/or fidelity. For example, each racking unit could have several shelves, each as an individual zone 70, a zone 70 with multiple resolvable locations within the zone 70, or more than one zone 70 per shelf. Zones can also be defined somewhat in size and shape by antenna power and design, lower power equates to a smaller zone. Also, RF blocking can be selectively utilized to end a specific zone 70. By configuring the respective overlapping zones 70, if an item shows up in two or more zones, then the location has higher fidelity and resolution as it must be in the overlap area shared by overlapping zones, which itself may be defined as a zone or a location within a zone in some embodiments.

The next process step is to place an RFID interrogator device 12 so that the intended zones 70 can be scanned. It is contemplated that a zone 70 could be comprised of a plurality of an RFID interrogator devices 12 to achieve an adequate degree of fidelity and/or resolution if the product density is high or if the nature of the warehouse and materials involved that scanning is difficult. It is further contemplated that a zone 70 could be comprised of a one or more RFID interrogator devices 12, in which each RFID interrogator devices 12 can be configured to scan at least one zone, or at least a portion of two or more zones (as a user configures the global inventory database subsystem 20 for the desired resolution and/or fidelity of the system output to the user).

Figure 16:
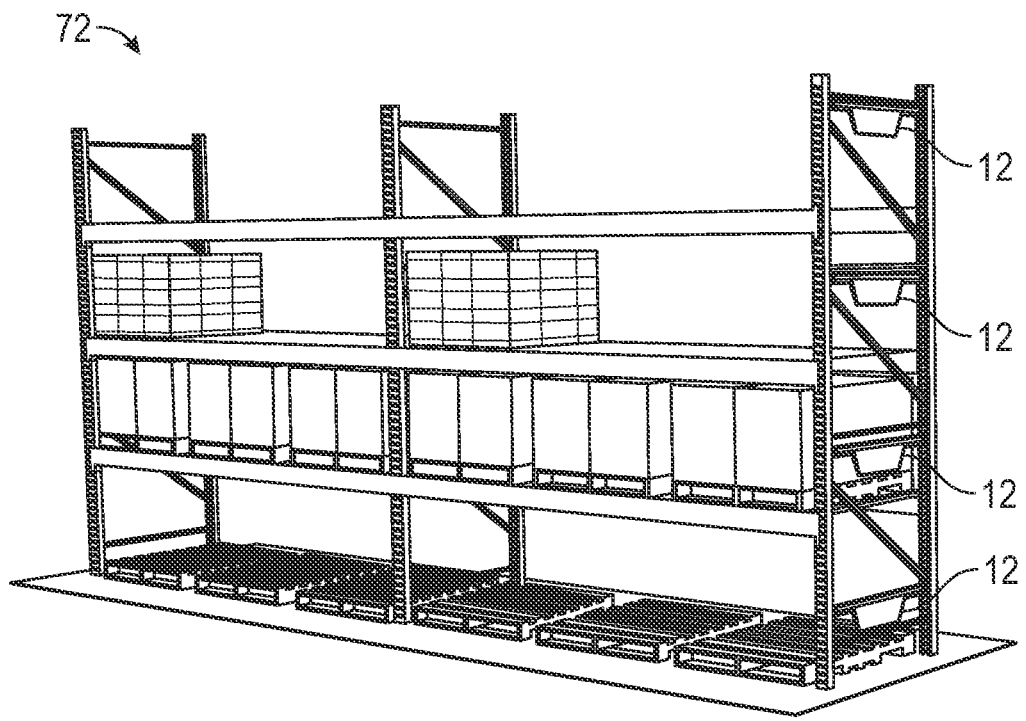
FIG. 16 illustrates four RFID interrogators installed on a racking unit that would scan the individual bay or shelf, in an embodiment.

In one non-limiting example, FIG. 16 shows four RFID interrogator devices 12 installed on a racking unit that could be configured to scan the individual bay or shelf. However, it is also contemplated that the RFID interrogator devices 12 could be mounted and come in many form factors such as drones or ROV's (remotely operated vehicles), wall or ceiling mounted, light fixtures, in rail cars or vehicles, and the like.

FIG. 16 illustrates an exemplary arrangement 72 of four RFID interrogators 12 (see also FIG. 6), as readers, at fixed positions. As previously described, increasing or decreasing the number of four RFID interrogators 12, in combination with the other optional process described herein can be used to change the desired resolution and/or fidelity of the system.

Figure 17:
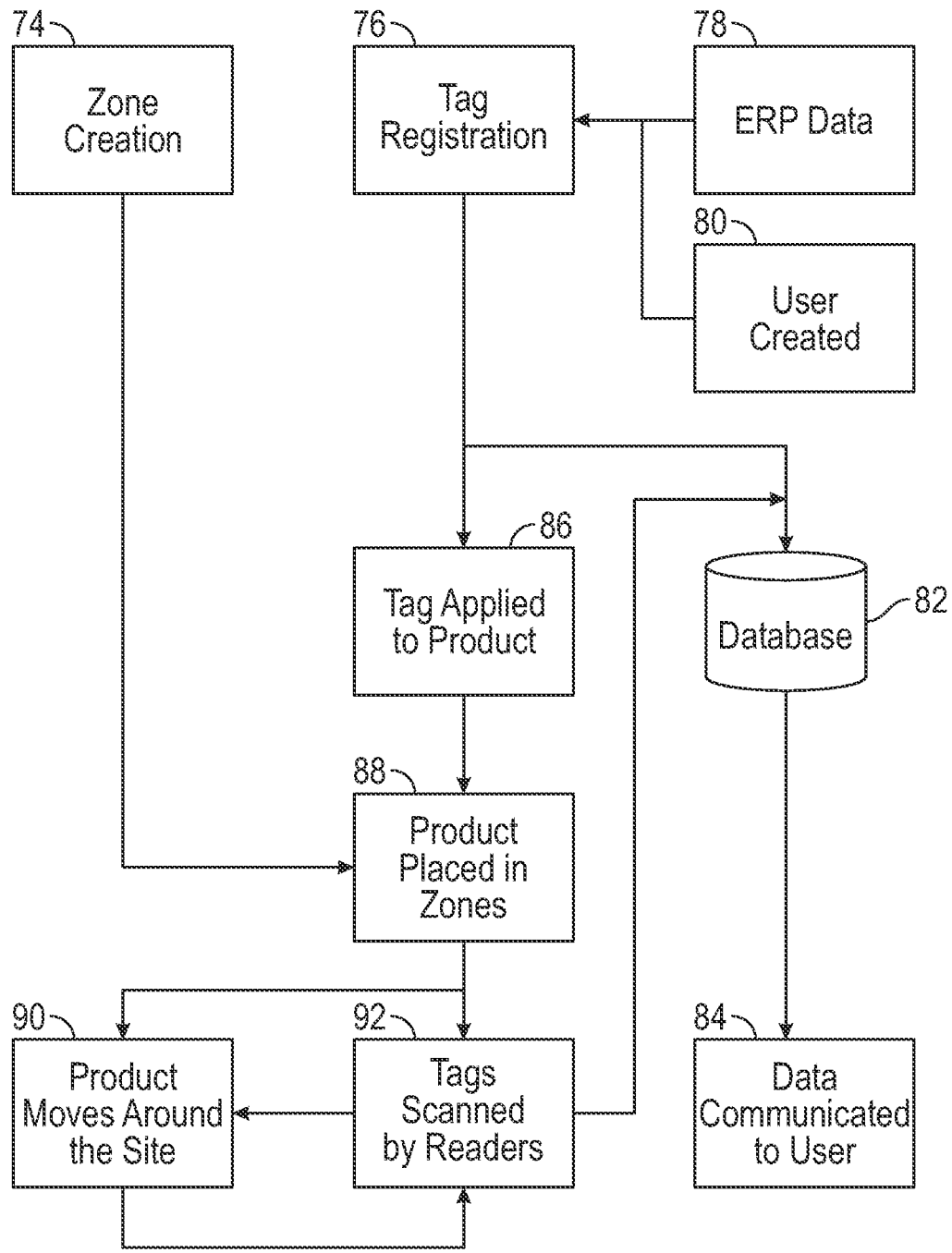
FIG. 17 illustrates a process flow, in an embodiment.

The next step in the process is to identify the items or assets to be tracked and "tag" them. Assets can be many things, as each case will define the required level of tagging. In the exemplary warehouse, each box of goods gets a unique tag. A tag is an RFID transponder that can come in many form factors and types. Some are for metal object tagging, some are for animal implanting, some are inexpensive paper tags, while some are heavy duty designed to withstand extreme environments. Tags are encoded with a unique identifier called an EPC (Electronic Product Code). However, tags can also be programmed with a user specific code if needed. Tags are then printed, or programmed, and registered within the software application of the global inventory database subsystem 20. They could also have barcodes or other user data on the tag if needed. The software application of the global inventory database subsystem 20 can also pull from other ERP (Enterprise Resource Planning) or accounting/inventory management software. For example, if a user purchases incoming goods through their accounting software, tags could be auto generated and integrated in the Venatrust software application. Within the application software database, when a tag is registered, the EPC code on the tag is attached to user friendly names as well. For example, a particular EPC (not user friendly) might be attached or associated in the database to a "Red Jacket" (user friendly). That way a user can see how many "Red Jackets" they have as opposed to a list of arbitrary EPC's. FIG. 17 shows the general process flow.

FIG. 17 illustrates an exemplary process flow involving zones, RFID tags and RFID interrogators 12, which is suitable for use at a site and with a system as described herein in various embodiments. Action 74 is zone creation, in which various zones are identified and RFID interrogators are placed to define the zones (and, possibly, locations within zones). Action 76 is tag registration, in which ERP data 78 and user created data 80 are associated to RFID tags, with appropriate entry of information to the database 82 (e.g., through a database system). Action 86 is tag applied to product, in which each RFID tag is associated to a corresponding product (e.g., an item of inventory to be tracked by the system), for example by attaching the RFID tag to the product, product packaging, or container holding product(s). Action 88 is product placed in zones, in which the products with RFID tags applied in the action 86 are placed in the various zones that were created in the action 74.

In the action 92 tags scanned by readers, the RFID interrogators 12 scan the RFID tags, and the system reports the scan information and determinations of locations of the RFID tags according to the zones and possibly locations within zones, to the database 82. The action 92 is repeated with occurrences of the action 90 product moves around the site, so that product location and product movement, as determined by the system, are represented in records in the database 82, with appropriate fidelity and resolution (which may be flexible and vary by location, physical set up, system and/or user defined parameters, and so on). Action 84 data communicated to user, involves access(es) to the database 82, and could be implemented through various communications protocols and with various system analyses as appropriate to a specific implementation.

Figure 18:
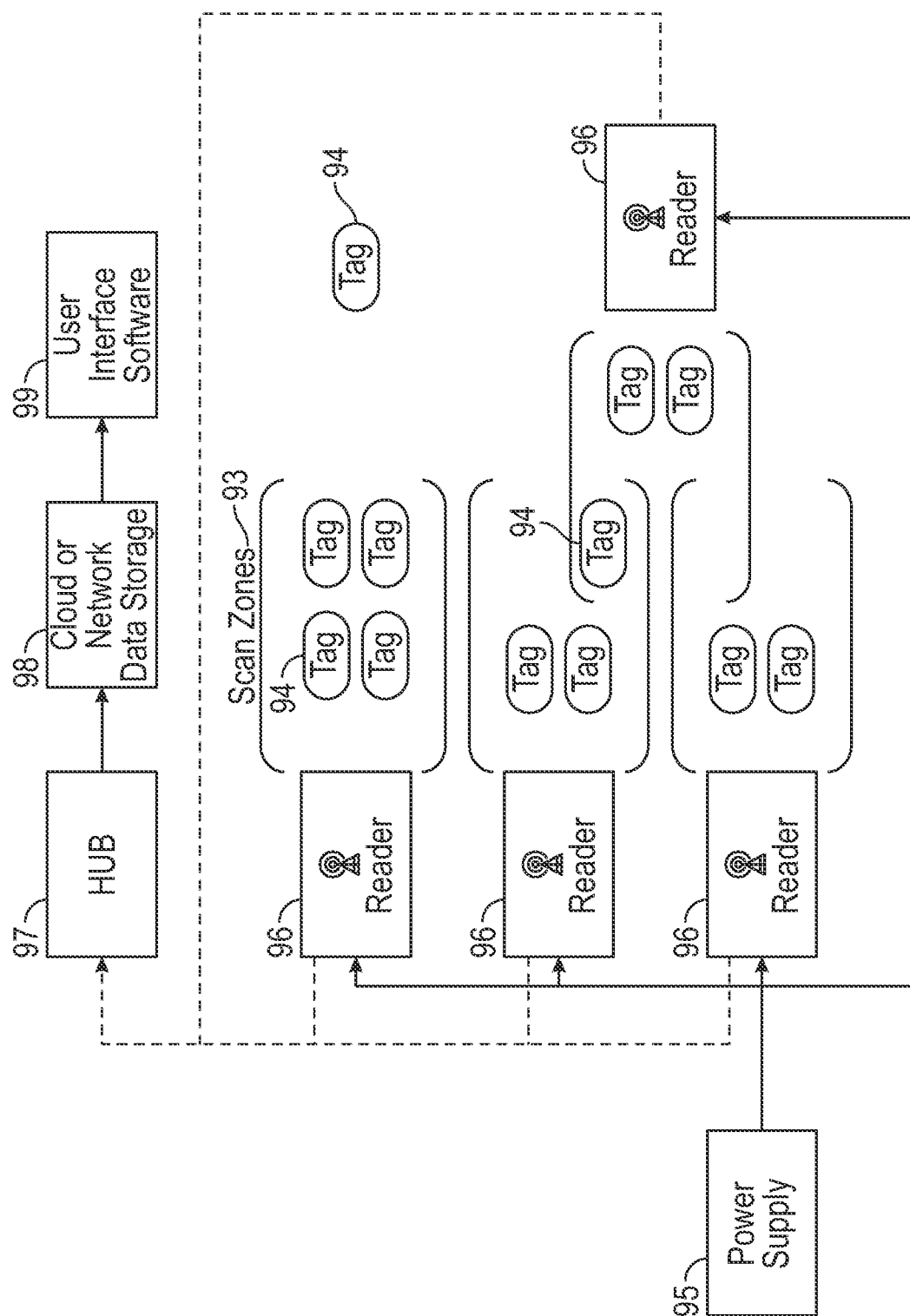
FIG. 18 illustrates an example RFID interrogator (reader)/hub system.

The next aspect the process is the hub. Hubs are devices that communicate locally with an array of readers. RFID interrogators 12 are designed to communicate through either a wired or wireless connection to the hub, and the hub then communicates to the database and the application software. Methods of communication from Reader-to-Hub include hardwire cable, Wi-Fi, Xbee/ZigBee, Bluetooth, and similar data stream connectivity methods. Hubs act as traffic controllers and the link to the database and application software. They also have the responsibility to issue scan commands to their respective array when a command is triggered from the system. A full system could be comprised of many readers and hubs all linked to a specific customer or site, or even multiple customer sites. Hubs can be comprised of an array of communication options, including Xbee/ZigBee, Wi-Fi, cellular modem, BLE, LoRa, LAN routers, etc. Hubs also comprise an SBC (Single Board Computer) and an HMI (Human Machine Interface). The onboard computer and touchscreen allow for setup and diagnostics of the system. It can monitor reader and battery health, connectivity, and other related functions. FIG. 18 shows an exemplary schematic of a RFID interrogators/Hub system.

In FIG. 18, tags 94 (i.e., RFID tags) are shown in various zones adjacent to readers 96 (i.e., RFID interrogators). RFID interrogators 12 are connected to a power supply 95 for power, and they communicate back to a hub 97. The dashed lines indicate wired or wireless communication from the reader 96 to the hub 97. In this example, a tag 94 is outside a scan zone 93 and thus would be "missing" from the system. This could indicate misplaced, lost, destroyed, sold, or pilfered items. Tags 94 in overlapping zones 93 have higher location resolution as well as product resolution as they will appear to be in multiple zones 93 at once.

Hubs 97 communicate to the database and server through various means. This could be a wired or Wi-Fi connection to a local network, cellular connection to the cloud, or other means of system connectivity. Hubs 97 are also registered within the software application with an identifier to assist in diagnostic and location functions.

Figure 19:
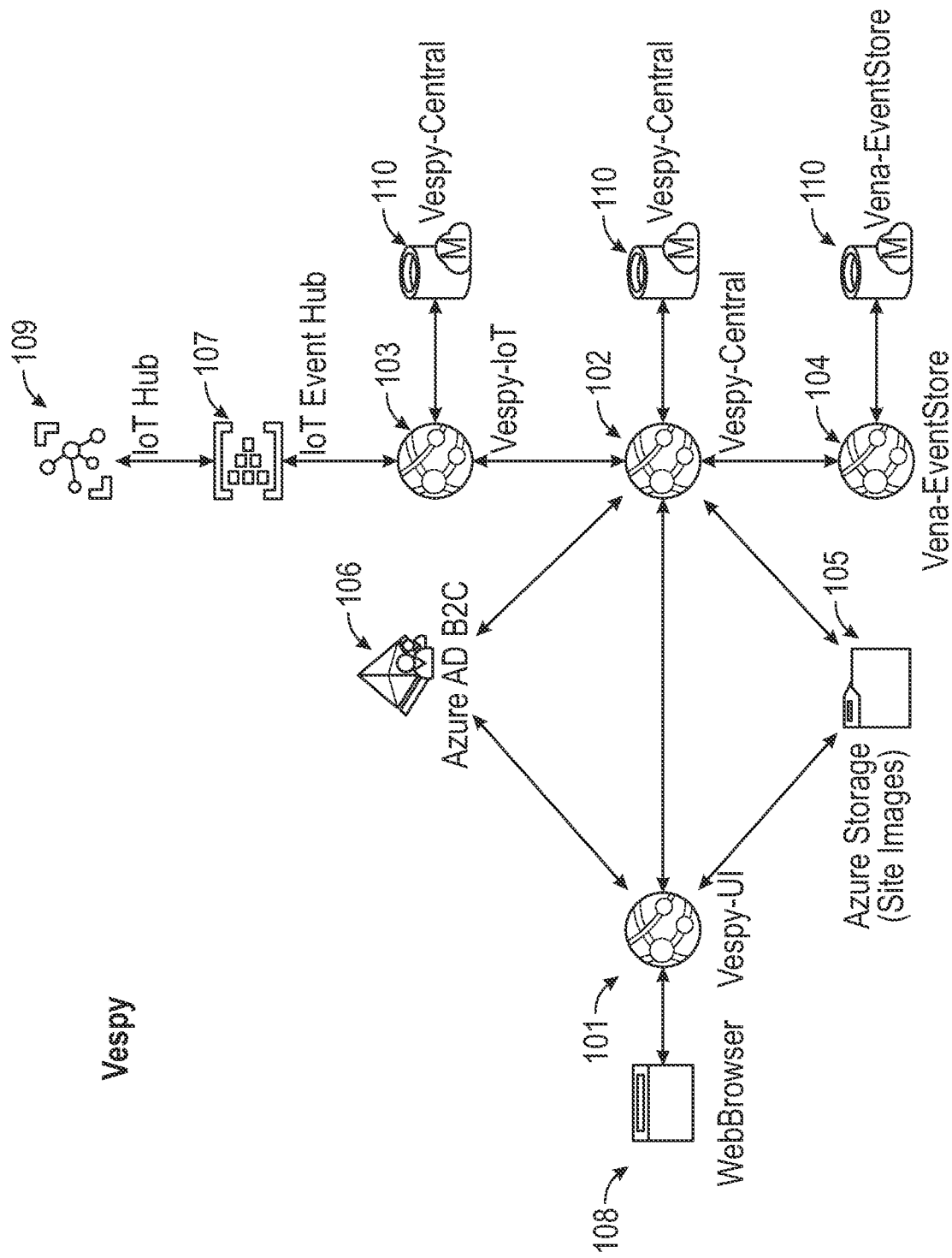
FIG. 19 illustrates structure of a database system, in an embodiment.

One further aspect to the system, in one embodiment, is the server, database, and application software. The database can reside in the cloud or local to a user site, for example in cloud or network data storage 98. User(s) can access the database through user interface software 99. In one embodiment, the database stores all relational data, historical and current, including EPC's, names, timestamps, zone location, etc. (see also database embodiment in FIG. 17). FIG. 19 illustrates the structure of one such database system, with the sub-systems shown. The UI, where the end-user communicates and views the data can be through a web browser, or mobile/desktop application. Variations and further database systems may also be suitable.

FIG. 19 illustrates a schematic of a database system, called Vespy, that forms a portion of the global inventory database subsystem 20. The various components of the Vespy database system can be implemented in software (e.g., executing on a processing device), hardware, firmware, and various combinations thereof in various embodiments. In the Vespy database system, a user can access the database system through, for example and without limitation, a web browser 108, the user interface Vespy-UI 101, and the like. In one embodiment, Vespy-UI 101 is a reactive single page application providing user interaction, configuration and display. Vespy-UI 101 permits tuning of reader overlap (Zones), scanning frequency, and display of up to the moment information on status of inventory assets.

One aspect of the Vespy database system, Vespy-Central 102, provides information to the UI (e.g., for queries), and handles configuration commands. Vespy-Central 102 transforms machine level data to provide human intelligible information, through algorithms that process large numbers of asset events from Vespy-IoT 103 to provide user tailored location information at the area (Zone) or fine location (e.g., from rssi and/or RFID sensing overlap of RFID readers/interrogators) level. Vespy-Central 102 processes configurations for volume and frequency of monitoring.

One aspect of the Vespy database system, Vespy-IoT 103, transforms bulk machine data from devices in the field into informative events (e.g., frex: tag changes zone). Vespy-Central 103 performs the filtering of repetitive scan information to reduce the usage of downstream components.

An additional aspect of the Vespy database system, VenaEventStore 104, stores a continuous stream of all events from update sources. VenaEventStore 104 allows the system to detect the status of a tag at any time point during system operation. VenaEventStore 104 allows the review of the complete life cycle of the tag for the duration of the journey of the tag in the system. Historical tracking of tag movement can be replayed at any point in time for forensic purposes. VenaEventStore 104 permits the processing of large numbers of events without collision.

One aspect of the Vespy database system, Azure Storage (Site Images) 105 provides a storage solution for user site images.

One aspect of the Vespy database system, Active Directory 106, provides industry standard identity management.

One aspect of the Vespy database system, IoT Event Hub 107, is a focal point for device events. The system is configured to leverage the Azure IoT Event Hub 107 to process incoming device messages at scale.

In the Vespy database system. The Web Browser 108 provides user access to the database system. The user can access an application as a web app, in various embodiments.

One aspect of the Vespy database system, the IoT Hub 109, is the Azure device registration for communications.

Figure 20:
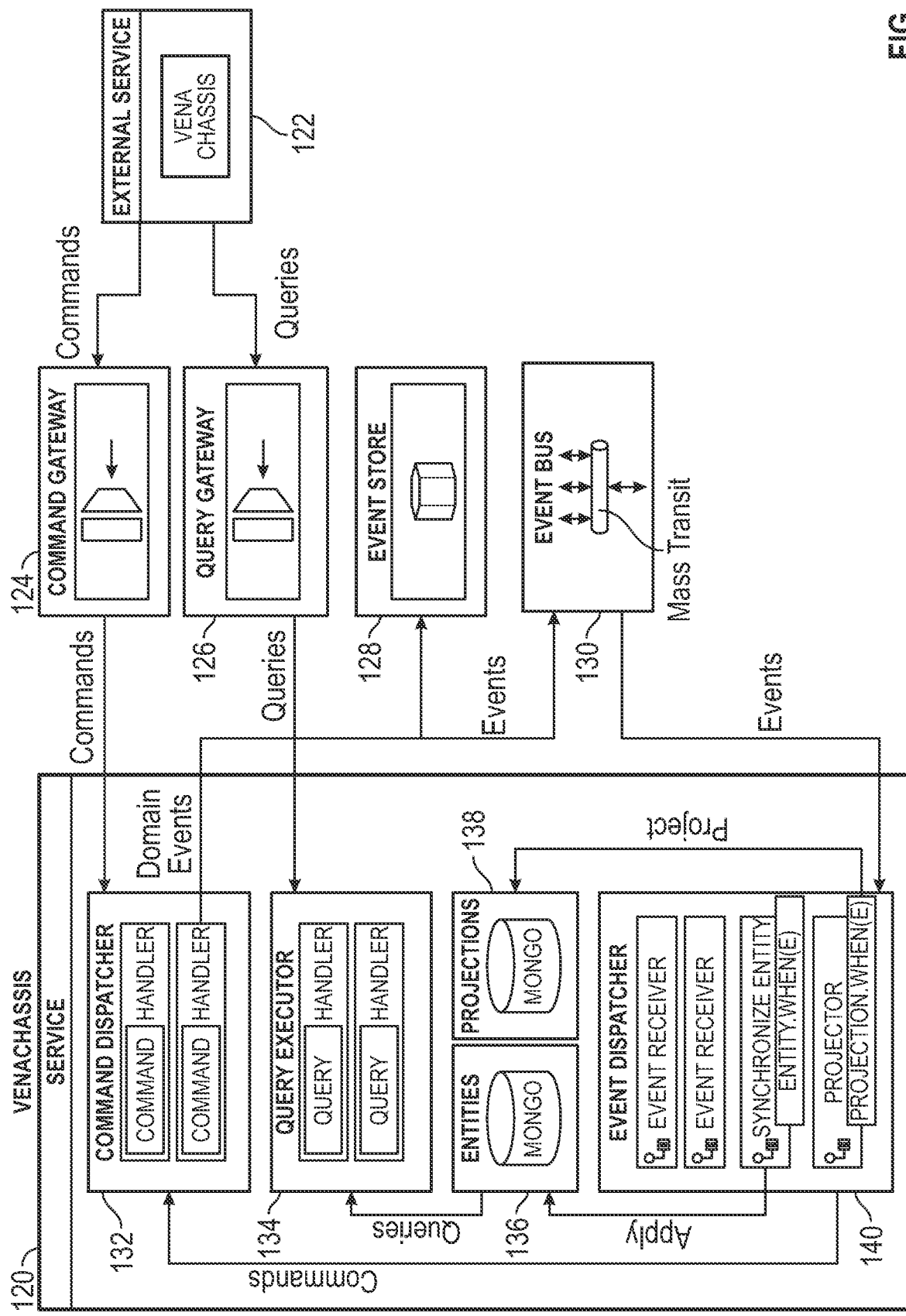
FIG. 20 illustrates a process flow, in an embodiment.

FIG. 20 shows the SOP process flow within the application, including events, command issues, and queries. The various components illustrated in the process flow are implemented in software, hardware, firmware, and combinations thereof in various embodiments. Commands and queries are issued by external services 122, which includes the Vena Chassis. Commands proceed through the command gateway 124, which may have a queue, command sorter, command combiner or other command front end handling, to the command dispatcher 132, which may have one or more command handlers (e.g., two command handlers shown). Queries proceed through the query gateway 126, which may have a queue, query sorter, query combiner or other query front end handling, to the query executor 134, which may have one or more query handlers (e.g., two query handlers shown).

The event bus 130 passes domain events from the command dispatcher 132 to appropriate components, for example RFID interrogators, and domain events are also sent to the event store 128, for example, a database. Events are also passed through the event bus 130 and from the event bus 130 to the event dispatcher 140, which has one or more event receivers (e.g., two event receivers shown), a synchronize entity and a projector. The synchronize entity sends apply to the entities 136, for example a database called Mongo (which may mean a large amount of memory). The projector sends project to projections 138, for example another database also called Mongo (e.g., a large amount of memory). Entities 136 provides queries to the query executor 134.

The software application closes the loop and communicates to the user the results of the scans, the current state and health of the system and assets, and historical data from the system as well. It can also communicate back to ERP or POS (Point of Sale) systems. For example, if items were sold, and they were scanned leaving the front door, they can be removed from the system. Pilfered, lost, or misplaced items can also be reported and then reconciled. If the user desires to locate a specific asset within the site, this could be achieved with a spontaneous scan for a specific item by name or EPC. Historical data can also be reported for tracking and analysis. For example, in a manufacturing facility, bottlenecks could be identified with historical data showing that an asset tagged as "Raw Material Cart A" was scanned entering the "Assembly Room" zone at a specific time and then was scanned leaving at a subsequent time. With user levels and access permissions, different tasks and reports can be assigned to different personnel within a facility. With the map generated in the beginning of the process, the software application can visually show assets, asset quantity, their respective location or travel history through the zones, time spent at a certain location, location and time last seen, etc. The application software is intended to be customizable to account for the specific customer needs.

Figure 21:
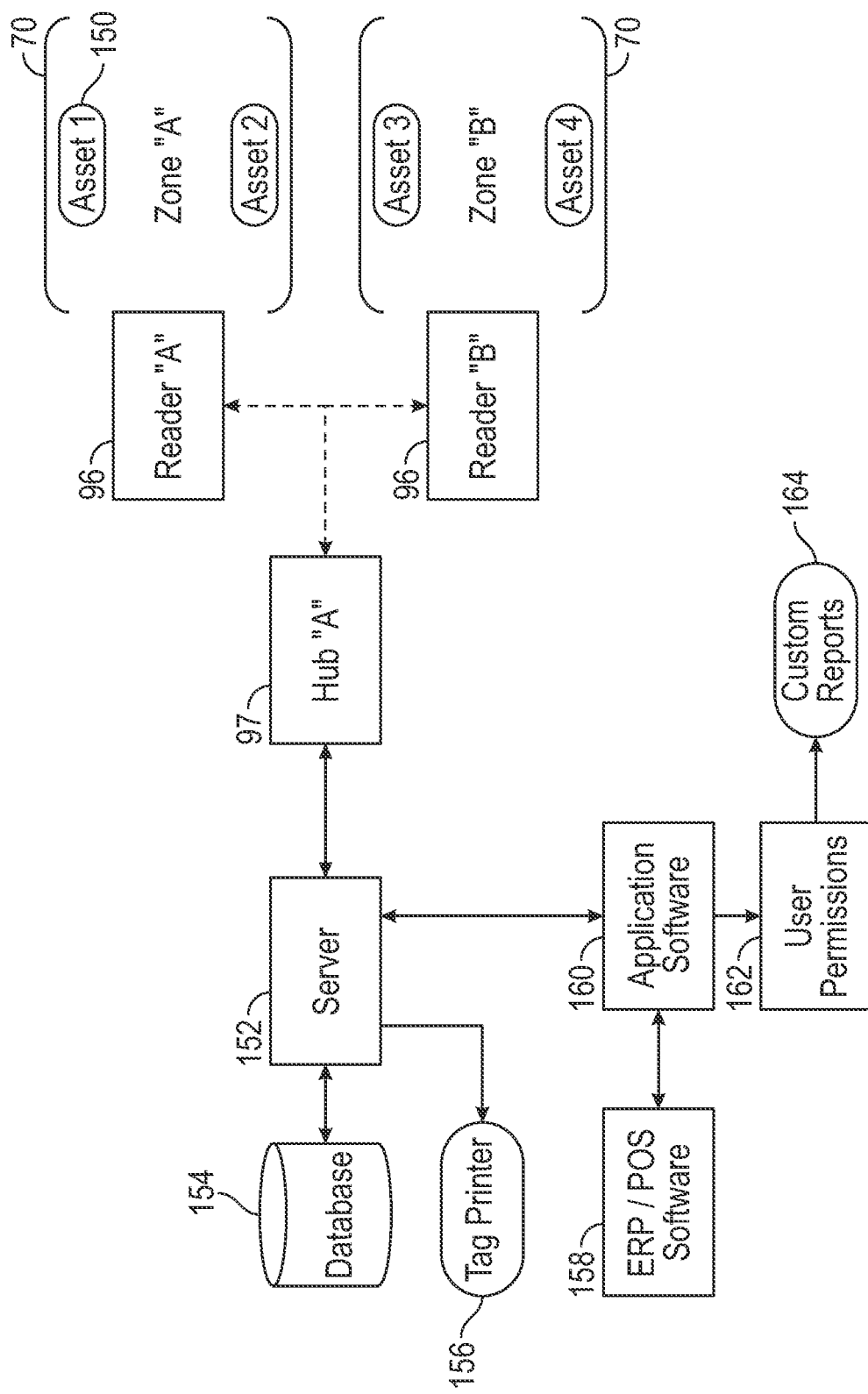
FIG. 21 illustrates an example of a basic system architecture with two zones, one hub, and four assets.

FIG. 21 shows an exemplary schematic of a system architecture having two zones 70 called Zone "A" and Zone "B", one hub 97 called Hub "A", and four assets 150 called Asset 1, Asset 2, Asset 3 and Asset 4. Reader 96 called Reader "A" oversees zone 70 called Zone "A" and scans assets 150 called Asset 1 and Asset 2. Reader 96 called Reader "B" oversees zone 70 called Zone "B" and scans assets 150 called Asset 3 and Asset 4. The readers 96 communicate through hub 97 called Hub "A" with the server 152, which communicates with the database 154 and the tag printer 156. Server 152 also executes ERP/POS software 158 and application software 160, and generates custom reports 164 according to user permissions 162.

Figure 22:
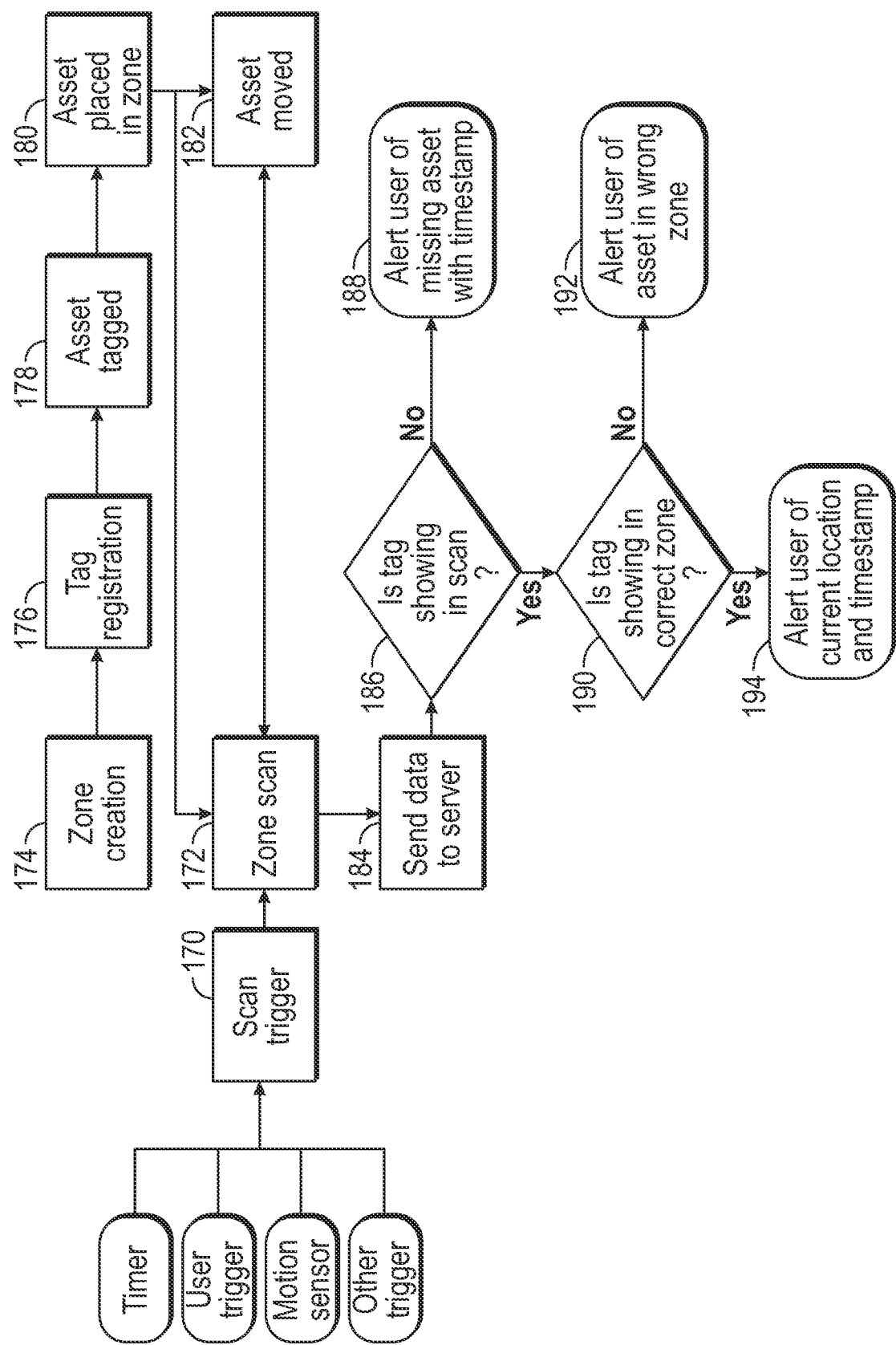
FIG. 22 illustrates a process flow for the system of FIG. 21, in an embodiment.

FIG. 22 shows one of many possible process flows of the FIG. 21 system (or variation thereof) based on the need for loss prevention of a high value asset. For system set up, there are the actions of zone creation 174, e.g., identification of zones, placement of RFID readers or interrogators and system parametric association of zones and possibly locations within zones to the RFID interrogators, tag registration 176, asset(s) tagged 178, and asset(s) placed in zone 180. A zone scan 172 is initiated by the scan trigger 170 responding to a timer, user trigger, motion sensor or other trigger, and may determine asset moved 182. The zone scan 172 performs the action of send data to server 184.

In response to data being sent to the server in the action of send data to server 184, flow proceeds to a determination action 186. In a determination action 186, the system determines is a tag showing in a scan. If the tag is not showing in a scan, the system generates an alert 188 to alert the user of missing asset with timestamp. If the tag is showing in a scan, flow proceeds to a determination action 190. In the determination action 190, the system determines if a tag is showing in a "correct" zone. If the tag is not showing in the correct zone, the system generates an alert 192, alert user of asset in a "wrong" or non-anticipated zone. If the tag is showing in the correct zone, the system generates an alert 194 to alert the user of current location and timestamp of the RFID identified tag/object.

Figure 23:
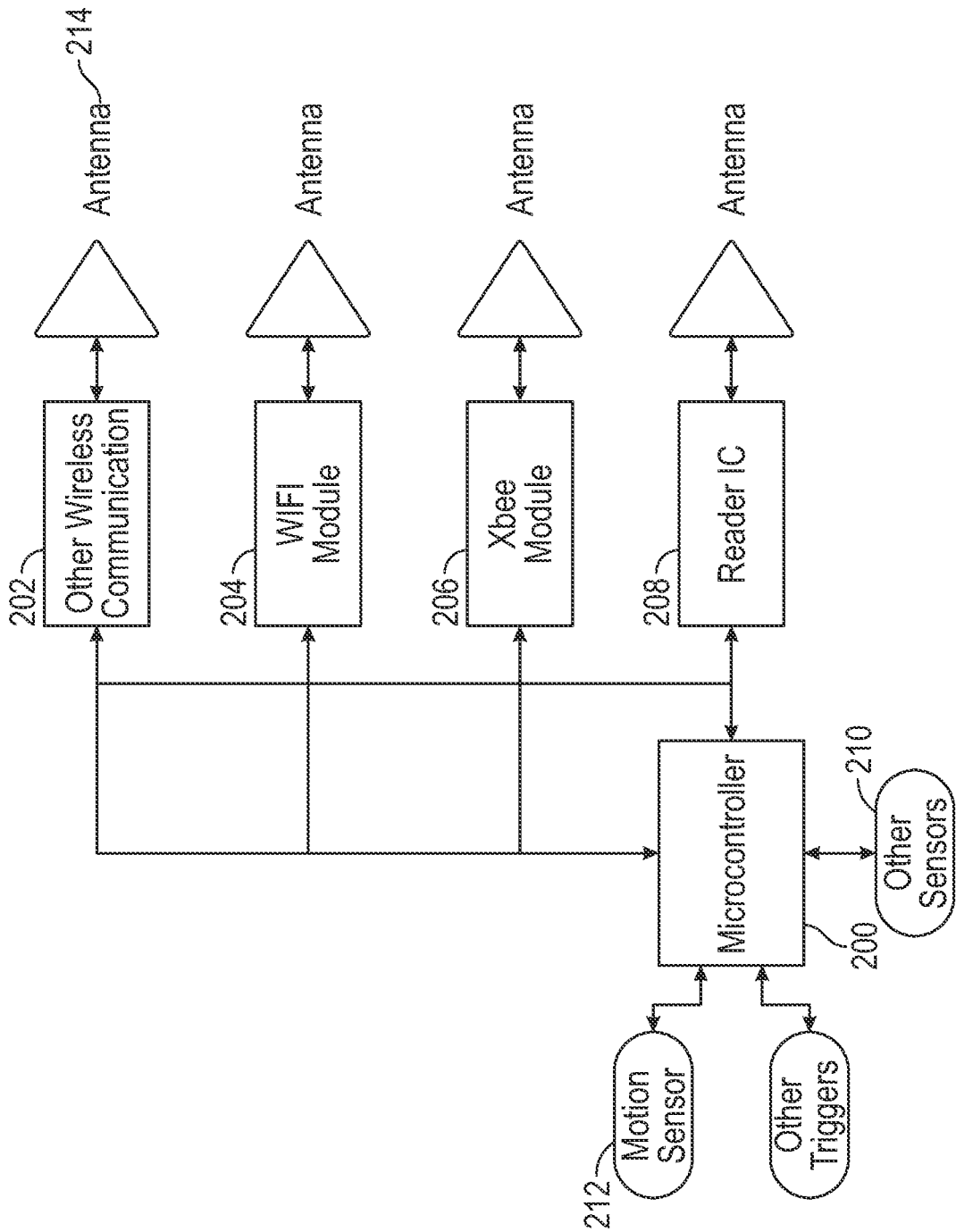
FIG. 23 illustrates an example of a basic system schematic of an RFID interrogator, in an embodiment.

RFID interrogators can include at least the following, as exemplarily shown in one embodiment in FIG. 23. A microcontroller 200 configurable or otherwise capable of running firmware to handle local commands and GPIO. A Reader IC 208 that operates the RFID antenna 214, sending and receiving RFID signals. An RFID antenna 214 that transmits and receives the RF energy to and from the RFID tag. Sensors and triggers, such as a motion sensor 212 and/or other triggers, that can give the microcontroller 200 feedback in order to trigger a scan or report states or conditions. Besides motion sensor(s) 212, other sensors 210 might include temperature, humidity, door sensors, shock, inertia, vibration, and the like. Xbee 206, WIFI 204, and other wireless communication 202 modules and methods. This could be one or more of many methods used in tandem or as a redundancy program to send/receive data to the hub, and the antenna 214 required for their respective communication protocol.

Figure 24:
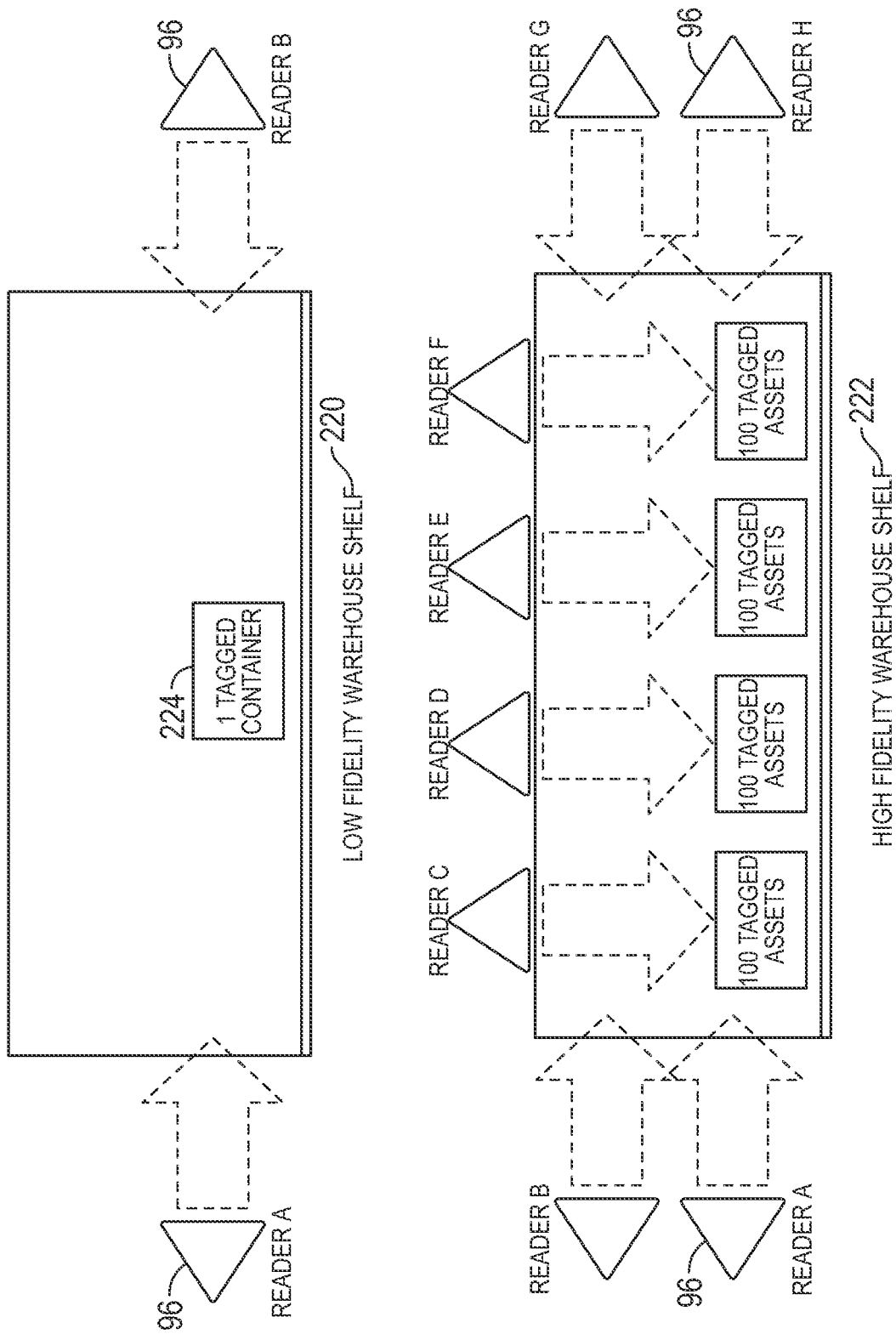
FIG. 24 illustrates an example of a basic of a low versus high fidelity system, in an embodiment.

As one will appreciate, the system is able to be configured to handle a wide range of tag density by user adjustment of the respective fidelity/resolution levels of the system. In one aspect, higher fidelity to granularity of number of the RFID tags of items that can be detected at a location can be determined through capability of detecting multiple RFID tags at a location, for example by a plurality of RFID interrogators 12 each capable of detecting multiple RFID tags. To provide an example of the bookends of such environments, one could have a warehouse shelf that is 5 ft.×5 ft.×10 ft. or 250 ft$^3$. In one scenario, there might only be 1 tagged container in the shelf. In the other extreme, there might be 4 containers, each containing 100 tagged shirts. A variance from 1 tag per 250 ft$^3$, all the way to 400 tags per 250 ft$^3$ is possible for such fidelity. In higher density tag environments, the system could optionally involve one or more RFID interrogators 12 penetrating the target space from different angles. This provides a higher degree of resolution and/or fidelity of the target space being scanned. This also helps with RF unfriendly assets such as liquids and metal objects. FIG. 24 shows one exemplary example of low vs. high fidelity system.

FIG. 24 depicts a low fidelity warehouse shelf 220 and a high fidelity warehouse shelf 222, with arrangements of RFID interrogators 12 appropriate to a targeted fidelity. The low fidelity warehouse shelf 220 has two readers 96, called Reader A and Reader B, in an arrangement suitable for detecting one tagged container 224. The high fidelity warehouse shelf 222 as eight readers 96, called Reader A, Reader B, Reader C, Reader D, Reader E, Reader F, Reader G and Reader H, in an arrangement suitable for detecting four groups of 100 tagged assets each, with appropriate fidelity and resolution.

In the case of resolution, the system can be user customized to provide the desired level of fidelity and/or resolution for respective tags geo-spatial location. In one aspect, lower resolution of the RFID tags of items could be based on a single RFID interrogator detecting an RFID tag at a location, and higher resolution of physical location of the RFID tags of items could be based on multiple RFID interrogators detecting the same RFID tag at a time of determining physical location of the tag, for example RFID interrogators with overlapping sensing areas. For example, the user might only require to know if a tag is on the example 250 ft$^3$ shelf. Thus the shelf, in the system software (e.g., parametric association of zones, resolution and RFID interrogators) is a single zone, with multiple RFID interrogators. The system only has to identify that the tag is somewhere on the shelf. However, if the user needs change, and they require much higher resolution, the system can be modified (e.g., change parametric association of zones, resolution and RFID interrogators, and/or change the physical arrangement of readers) to meet those needs.

In one aspect and as described herein, system customization provides for multiple pathways for meeting the evolving user needs without the necessity for adding additional RFID interrogators after an initial install within a warehouse space. With the system toolbox approach, there are many tools to employ to meet those needs. It is the combination and coordination of these tools that allow the system to perform optimally.

It is contemplated that one such tool is RFID interrogator placement. RFID interrogators cab be placed logistically in the environment or site in such a way as to not interfere with the user's normal functions and such that they will likely not get moved or damaged. The RFID interrogators can also be positioned in the warehouse space in such a way that all the space that is intended to be covered, is covered, thus no dead spots.

Another such tool is scan management. Scan management refers to how and when the system triggers scans. This could be as simple as timers set up in the system software, or even user triggered scan. If a user needs specific zones scanned more frequently than others, a user can set up the system to implement various auto-scan routines. Optionally, if a user needs to identify when a particular RFID tagged asset is currently located, the user can trigger a spontaneous scan. Optionally, it is contemplated that other scan triggers could be sensor based. For example, if the identified need for a particular zone is loss prevention, the RFID interrogator could be triggered as a result of an input received from an integrated motion sensor and a door trigger. In this exemplary aspect, any time someone is in the area or opens the door the system would trigger. Thus, for this solution, there would be no need to have the scanner active all of the time as either or both actions triggering a scan of the area any assets leaving a specific area would be identified.

Zone definition can provide another user configurable aspect of the system. In operation, users have the ability customize the scan zone and RFID interrogator relationships within the software (e.g., system and/or user-defined parameters) so as to represent a space as 1 or more zones, even though it may have fixed or varying number of RFID interrogator. In the described example above, the warehouse shelf is set up as 1 zone, but in fact it may have 8 readers all scanning from different angles into the desired identified space thereby effectively creating 8 read sub zones in this example, as shown in FIG. 25.

Figure 25:
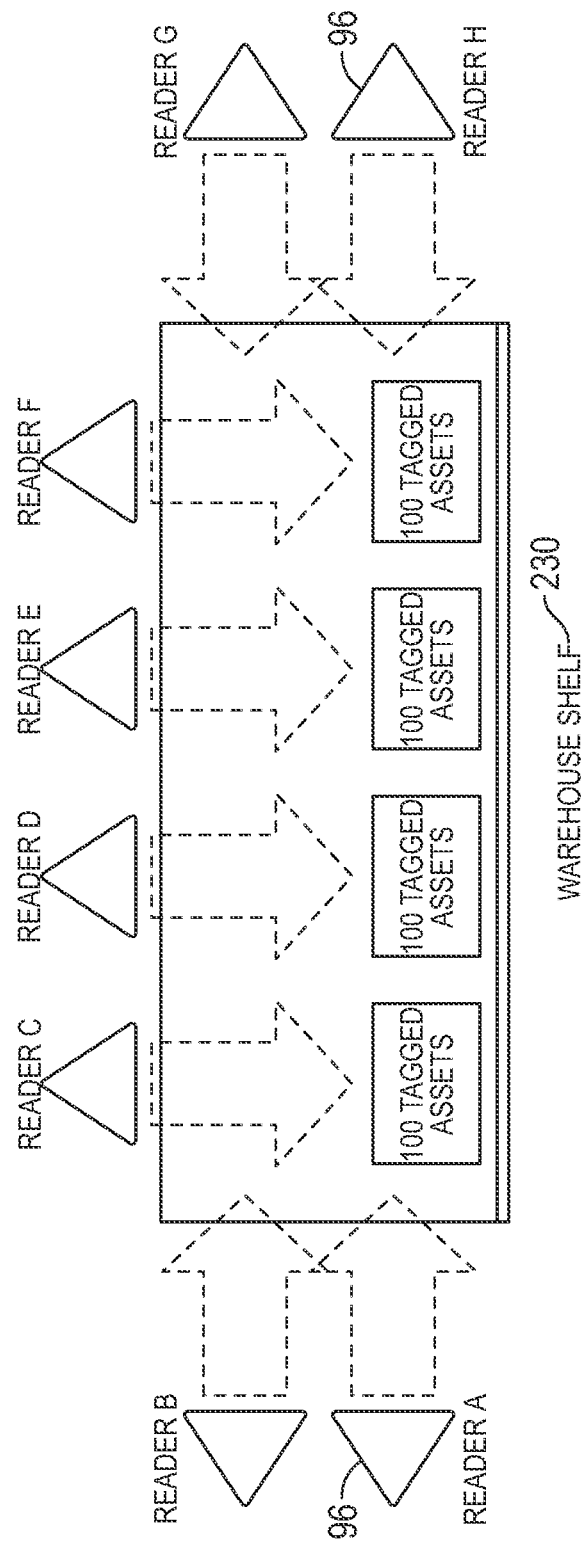
FIG. 25 illustrates an example set up for a warehouse shelf with multiple RFID interrogators.

In this example warehouse shelf 230 in FIG. 25, eight readers 96 called Reader A, Reader B, Reader C, Reader D, Reader E, Reader F, Reader G and Reader H scan into the shelf, but the user can then customize how this performs and reports within the system software. For example, this zone could be named "Shelf 1". All of the readers 96 report present tags as residing in "Shelf 1", so the system would report 400 individual assets in "Shelf 1". This is an example of higher fidelity, but lower resolution. As the user resolution/fidelity needs change, and the need shifts to know, "Where are the individual tags located within Shelf 1?" In one aspect, the system can be configured to sub-divide the location "Shelf 1" into sub-locations. As one will appreciate, the system allows for the user defined creation of very complex sub-zones that allow the system to identify with a high degree of resolution.

Figure 26:
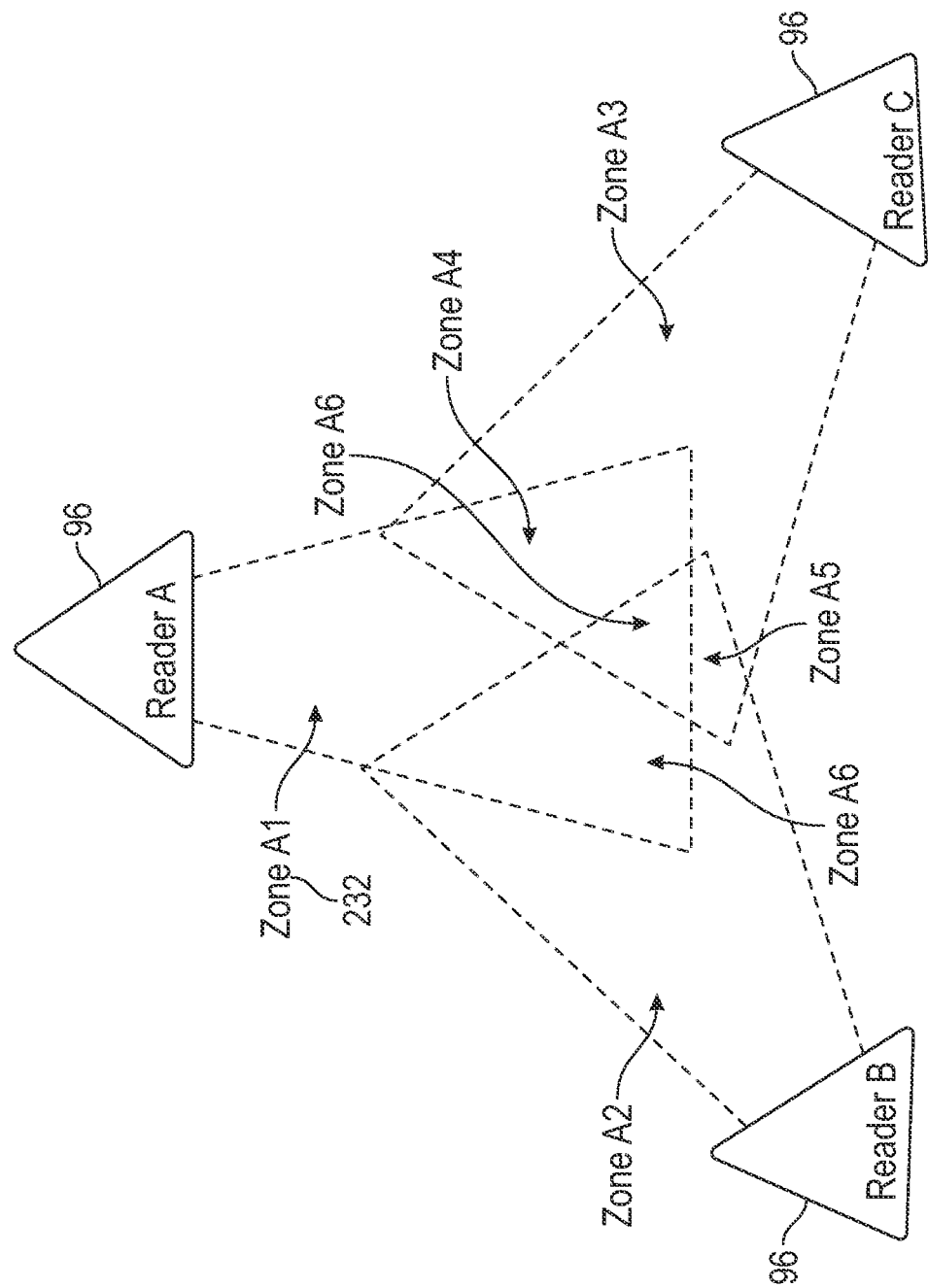
FIG. 26 illustrates a multitude of zones achieved through placement of RFID interrogators, by varying quantity of RFID interrogators, by varying signal strength of the respective RFID interrogators, and/or by varying azimuth orientation of RFID interrogators.

Below in FIG. 26, a diagram of three readers 96 can be seen, as well as the multitude of zones 232 that can be achieved. By looking at overlap of the respective zones, if a RFID tag shows up on 2 or more readers 96 (RFID interrogators 12), the system can provide a high degree of resolution or asset location. Zone definition is a practically endless combination of zone/sub-zone grouping and defining. By defining zones 232 in the software with user-friendly names or locations, the system has the ability to report where a specific asset is within a very small space. Generally, there is a realistic limit to the capable spatial resolution of the system. As more readers can mean higher resolution, a reasonable system that can pinpoint an asset to within a cubic foot would likely solve most user needs.

Another optional system process that is useful in monitoring/configuring desired resolution is the use of RSSI (Received Signal Strength Indicator). RSSI is a value placed on the returning signal from the tags representing the strength of the signal. In various embodiments, an RFID interrogator or processing device determines the RSSI while reading an RFID tag. The RSSI value can be used by the system to determine the distance from the scanning antenna RFID interrogator to an RFID tag. There are many factors that can influence RSSI, but once the system is setup and has established a range of RSSI values, monitoring RSSI values can be a useful tool for approximate ranging in the system. In this aspect, when an RFID tag is scanned and responds to the RFID interrogator, not only is the EPC code or ID sent to the server, but an RSSI and timestamp are attached to the data record.

Optionally, the system and process can configure RF blockers to create a barrier to RF scanning, thus giving the user the ability to define a customizable, definitive end of one zone and/or the beginning of another. For examples, the RF blockers could be placed on a warehouse racking system or on a wall to prevent scanners from detecting tags in other areas not intended to be read.

In a further optional aspect, the system and process can configure scan power and scan duration of the respective RFID interrogators 12. The system and process can provide user customized adjustable settings from within the software system that can assist in defining the fidelity and/or resolution of the system. It is contemplated that each individual RFID interrogator 12 has its own adjustable values. For example, and without limitation, the greater the output power, the longer the range and/or strength of the generated interrogation signal strength. Similarly, the longer the scan cycle generated interrogation signal, the greater the chance of picking up all RFID tags within a define scan space. It is further contemplated that the system and process can provide for user electable time frames for the application or higher power signal generation and interrogation, i.e., the application of higher power signal generation and interrogation can, for example, be limited to time frames and/or zones in which no personnel are currently present.

In another optional aspect, the system and process can provide for system site mapping, which is a visual tool for a user to be able understand various data outputs of the system in a graphical display. It is contemplated that such a system site application in the software system would be customizable with respect to the floor plan, site, or area that is in scannable space. For example, colors and graphical elements can be used to display and report tag locations, quantities, travel history of asset(s), last seen locations, and the like.

As previously discussed, the RFID tags themselves can form another customizable aspect of the system and process. Conventionally, RFID tags can come in exceedingly small packages or large robust units. Some RFID tags are active and can transmit long distances, as well as transmit sensor data such as temperature or humidity. Some RFID tags can be configured to be used with metal assets, and some are RFID tags are configured to be implanted. RFID tags variability gives more flexibility to the system, and the ability meet and customize the system to fit specific fidelity and/or resolution needs.

In a further additional optional aspect, the system and process contemplates the use of at least one RFID interrogator having at least one antenna, or a plurality of antennas, that is configurable for movement about an azimuth axis of the RFID interrogator. Optionally, it is also contemplated that a plurality of the RFID interrogators in a system setup can each have at least one antenna, or a plurality of antennas, that is configurable for movement about an azimuth axis of the respective RFID interrogator.

In this exemplary aspect, the use of movable antenna in the RFID interrogator(s) allow for an additional customizable increase/decrease in select system fidelity and/or resolution. Via the use of antenna that can move via motorized actuators, such as servo motors or stepper motors, antenna within the respective RFID interrogator can be pointed to specific and predetermined spaces along varied and selected signal generation azimuths. By knowing the parameters such as the azimuth, angle of rotation, etc., the system can effectively increase the number of zones in a given defines space that are being interrogated (e.g., each "azimuth zone" interrogated along a selected azimuth defines a single zone in which multiple tags are potentially identified and, as the incremental movement of the RFID interrogator antenna moves through the user selected azimuth angle range, it is contemplated that the respective azimuth zones, such as adjacent azimuth zones, will overlap to a degree, such degree being definable by the user). Thus, fidelity and/or resolution of the system can be further defined to desired levels of granularity.

As described above, as an antenna of the RFID interrogator scans signal generation axis of the respective RFID interrogator moves relative to the fixed space that is being interrogated. When a RFID tag appears, and then disappears from the through the scan process, it can be assumed that that particular RFID tag is within that angle of movement. In one additional optional aspect, by correlating to the RSSI data in memory, it can be assumed that when the RSSI is the strongest, the angle or azimuth of the antenna should be pointing directly at the RFID tag.

As previously noted, it is contemplated that similar results can be achieved by using multiple antennae in a single RFID interrogator. In this aspect, on setup, the system and process can record the azimuth direction of each antenna in the single RFID interrogator. The microcontroller can then selectively switch between the internal antennae and, based on what antenna is "active" when a tag appears, can signal to the system as to the respective azimuth of the RFID tag to the respective selected antenna of the RFID interrogator. If multiple RFID interrogators scan a RFID tag and each has a general azimuth, tag fidelity and/or resolution can be predicted and reported to the user.

A further feature to customized systems in some embodiments is antenna type and form factor. RFID interrogators and their respective antenna can be packaged in various forms for various environments or applications. Antenna designs provide different dispersion cones, ranges, and penetration parameters. Some antennae are designed for longer, narrower spreads, while others are the opposite. Antenna can also have motorized poles or planes to give a user software-controlled methods to vary an antenna design. In other words, by altering the structure of the antenna, the tuning can be changed. This in turn can alter the range and dispersion cone of the scanned/read zone(s) of the particular RFID interrogators used in the system.

As described in detail herein, the adaptive inventory management system for use in a materials handling facility can include a plurality of receptacles, a global inventory management system, and an RFID interrogator subsystem. In this aspect, the plurality of receptacles, such as the exemplified racks, can be configured to receive one or more items of a plurality of items, wherein each of the plurality of items is associated with a Radio Frequency Identification (RFID) tag. In this aspect, it is contemplated that each RFID tag stores a unique identifier as described herein.

Is this aspect, the global inventory database subsystem has a processing system having at least one memory of the processing system that is configured to store program instructions. The RFID interrogator subsystem includes a plurality of RFID interrogators and it is contemplated that at least one of the RFID interrogators can be mounted in a fixed geospatial location in the materials handling facility. Further, each of the RFID interrogators can be configured to read the unique identifier of the RFID tag associated with each of the plurality of items that are within a defined boundary of at least one scan zone generated by the respective RFID interrogator and to subsequently communicate the unique identifier of the each scanned RFID tag identified within each scan zone of the respective RFID interrogator to the processing system.

Thus, in operation, the at least one memory of the processing system is configured to store program instructions that when executed cause the defined boundaries each scan zone for each RFID interrogators to be selectively configured to effect user desired levels of fidelity and/or resolution with respect to the generated unique identifier of the each scanned RFID tag within a defined space of the materials handling facility.

In optional aspects, the defined boundaries each of scan zone for each RFID interrogators can be configured such that boundaries of the respective RFID interrogators do not overlap or, alternatively or in combination, the defined boundaries each of scan zone for each RFID interrogator is user configurable such that at least portions of the defined boundaries of the respective RFID interrogators overlap with at least adjacent or otherwise selected RFID interrogators to define at least one overlapping scan zone. In this aspect, each overlapping scan zone and the associated RFID identifier data therefrom are created from RFID identifier data received from each scan of the respective scan zones of the respective selected RFID interrogators, and the RFID identifier data of the each scanned RFID tag identified within overlapping scan zone is communicated to the processing system.

It is further contemplated that, in operation, the scan zones projected by each RFID interrogators can be selectively configured to effect user desired levels of fidelity and/or resolution via the use of one or more configurable program options to include at least one of: changing the number of RFID interrogators to change the number of scan zones projected by the RFID interrogators within the defined space of the materials handling facility; changing the use of overlapping scan zones projected by the RFID interrogators within the defined space of the materials handling facility; changing the use of signal strength or phase shifting modalities within respective scan zones projected by the RFID interrogators within the defined space of the materials handling facility; changing the use of steerable antenna technologies in each RFID interrogator to create multiple spaced scan zones generated from each of the RFID interrogators within the defined space of the materials handling facility; or changing the use of steerable antenna technologies in the RFID interrogators within the defined space of the materials handling facility to create multiple overlapping scan zones from each of the RFID interrogators.

Thus, the user desired levels of fidelity and/or resolution can be selectively increased via the use of one or more configurable program options to include at least one of: increasing the number of RFID interrogators to increase the number of scan zones projected by the RFID interrogators within the defined space of the materials handling facility; increasing the use of overlapping scan zones projected by the RFID interrogators within the defined space of the materials handling facility; increasing the use of signal strength or phase shifting modalities within respective scan zones projected by the RFID interrogators within the defined space of the materials handling facility; increasing the use of steerable antenna technologies in each RFID interrogator to increase the number of created multiple spaced scan zones generated from each of the RFID interrogators within the defined space of the materials handling facility; or increasing the use of steerable antenna technologies in the RFID interrogators within the defined space of the materials handling facility to increase the number of created multiple overlapping scan zones from each of the RFID interrogators.

Further, it is contemplated that the user desired levels of fidelity and/or resolution can be selectively decreased via the use of one or more configurable program options to include at least one of: decreasing the number of RFID interrogators to decrease the number of scan zones projected by the RFID interrogators within the defined space of the materials handling facility; decreasing the use of overlapping scan zones projected by the RFID interrogators within the defined space of the materials handling facility; decreasing the use of signal strength or phase shifting modalities within respective scan zones projected by the RFID interrogators within the defined space of the materials handling facility; decreasing the use of steerable antenna technologies in each RFID interrogator to decrease the number of created multiple spaced scan zones generated from each of the RFID interrogators within the defined space of the materials handling facility; or decreasing the use of steerable antenna technologies in the RFID interrogators within the defined space of the materials handling facility to decrease the number of created multiple overlapping scan zones from each of the RFID interrogators.

Optionally, it is contemplated that the geospatial location of each of the plurality of receptacles can be stored within the at least one memory of the processing system. Optionally, the geospatial location of the at least one of the RFID interrogators mounted in a fixed geospatial location in the materials handling facility can be stored within at least one memory of the processing system.

In a further aspect, at least one of the RFID interrogators can be a mobile RFID interrogator configured to be operated by a mobile agent of the materials handling facility.

In a further aspect, each RFID interrogator can have an interface to the global inventory database subsystem, which interface can be configured to be wired, wireless, or at least partially wireless.

In a further aspect, the RFID interrogator subsystem can further comprise at least one hub that is configured to act as a network node, which network node is configured to relay information to and from each RFID interrogator to the global inventory database subsystem.

In a further aspect, the at least one of the RFID interrogators mounted in a fixed geospatial location in the materials handling facility can comprises a plurality of fixed RFID interrogators mounted in a fixed geospatial location in the materials handling facility, In this aspect, each of the plurality of fixed RFID interrogators are spaced from each other and the geospatial location of the plurality of fixed RFID interrogators is stored within the at least one memory of the processing system. In this aspect, it is contemplated that the plurality of fixed RFID interrogators can include a direct wireless connection between the respective plurality of RFID interrogators for the sharing of certain data.

In another aspect, each of the plurality of receptacles can associated with a RFID tag that stores a unique geospatial location identifier. In this aspect, it is contemplated that the geospatial location identifier of each of the plurality of receptacles is stored within at least one memory of the processing system, whereby a combination of the known position of the respective fixed plurality of RFID interrogators and the known geospatial position of the respective receptacle mounted RFID tags aid in increasing the fidelity of the geospatial location of inventory items within the materials handling facility.

In a further aspect, and as further described herein, the unique identifier of the each scanned RFID tag comprises at least one of the unique identification code for each scanned item or the geospatial location identifier data associated with each scanned item to include the date and time of a scanning event, whereby the warehouse inventory management system can synchronize data associated with each inventory item received from different RFID interrogators.

As also described in further detail herein, the management system of can further comprise a motion detection subsystem that can be configured to detect movement within a defined region between a first physical zone and a second physical zone. In this aspect, in response to detecting movement, the processing system instructs the RFID interrogator subsystem to identify inventory items moving from the first physical zone to the second physical zone and to subsequently report item movement to the global inventory database subsystem, the identity of each item identified as having moved allowing for the global inventory database subsystem system to update the physical location of each item that transits from the first physical zone to the second physical zone. It is also contemplated that the global inventory database subsystem can be configured to activate a scan, or to prevent a scan, depending on the need and or event triggered by the motion detection subsystem.

In a further aspect, the global inventory database subsystem can be configured to activate a scan, or to prevent a scan, on a recurring or otherwise identified timeline or schedule.

As described in detail herein, the adaptive inventory management system for use in a materials handling facility can include a plurality of items positioned within a defined space of the materials handling facility, in which each of the plurality of items is associated with a Radio Frequency Identification (RFID) tag, wherein each RFID tag stores a unique identifier, a global inventory database subsystem and an RFID interrogator subsystem.

Is this aspect, the global inventory database subsystem has a processing system having at least one memory of the processing system that is configured to store program instructions. The RFID interrogator subsystem includes a plurality of RFID interrogators and it is contemplated that at least one of the RFID interrogators can be mounted in a fixed geospatial location in the materials handling facility. Further, each of the RFID interrogators can be configured to read the unique identifier of the RFID tag associated with each of the plurality of items that are within a defined boundary of at least one scan zone generated by the respective RFID interrogator and to subsequently communicate the unique identifier of the each scanned RFID tag identified within each scan zone of the respective RFID interrogator to the processing system.

Thus, in operation, the at least one memory of the processing system is configured to store program instructions that when executed cause the defined boundaries each scan zone for each RFID interrogators to be selectively configured to effect user desired levels of fidelity and/or resolution with respect to the generated unique identifier of the each scanned RFID tag within a defined space of the materials handling facility.

In optional aspects, the defined boundaries each of scan zone for each RFID interrogators can be configured such that boundaries of the respective RFID interrogators do not overlap or, alternatively or in combination, the defined boundaries each of scan zone for each RFID interrogator is user configurable such that at least portions of the defined boundaries of the respective RFID interrogators overlap with at least adjacent or otherwise selected RFID interrogators to define at least one overlapping scan zone. In this aspect, each overlapping scan zone and the associated RFID identifier data therefrom are created from RFID identifier data received from each scan of the respective scan zones of the respective selected RFID interrogators, and the RFID identifier data of the each scanned RFID tag identified within overlapping scan zone is communicated to the processing system.

It is further contemplated that, in operation, the scan zones projected by each RFID interrogators can be selectively configured to effect user desired levels of fidelity and/or resolution via the use of one or more configurable program options to include at least one of: changing the number of RFID interrogators to change the number of scan zones projected by the RFID interrogators within the defined space of the materials handling facility; changing the use of overlapping scan zones projected by the RFID interrogators within the defined space of the materials handling facility; changing the use of signal strength or phase shifting modalities within respective scan zones projected by the RFID interrogators within the defined space of the materials handling facility; changing the use of steerable antenna technologies in each RFID interrogator to create multiple spaced scan zones generated from each of the RFID interrogators within the defined space of the materials handling facility; or changing the use of steerable antenna technologies in the RFID interrogators within the defined space of the materials handling facility to create multiple overlapping scan zones from each of the RFID interrogators.

In this aspect, and as further described herein, the unique identifier of the each scanned RFID tag comprises at least one of the unique identification code for each scanned item or the geospatial location identifier data associated with each scanned item to include the date and time of a scanning event, whereby the warehouse inventory management system can synchronize data associated with each inventory item received from different RFID interrogators.

The foregoing has described various embodiments of warehouse inventory management systems and methods of operation thereof; and, in particular, to systems utilizing RFID interrogators. The disclosed systems and methods are provided to illustrate the essential and optional features and functions, and those skilled in the art may conceive of alternatives or modifications that do not depart from the principles of the invention as encompassed by the appended claims, and that such alternatives or modifications may be functionally equivalent.

What is claimed is:

1. An adaptive inventory management system for use in a materials handling facility, comprising:

a plurality of items, wherein each of the plurality of items is associated with a Radio Frequency Identification (RFID) tag, wherein each RFID tag stores a unique identifier;

a global inventory database subsystem having a processing system, wherein an at least one memory of the processing system is configured to store program instructions; and an RFID interrogator subsystem comprising a plurality of RFID interrogators mounted in respective fixed geospatial locations in the materials handling facility, wherein the plurality of fixed RFID interrogators includes a direct wireless connection between respective RFID interrogators for the sharing of certain data, and wherein each of the RFID interrogators is configured to read the unique identifier of the RFID tag associated with each of the plurality of items that are within a defined boundary of at least one scan zone generated by the respective RFID interrogator, and to communicate the unique identifier of the each scanned RFID tag identified within each scan zone of the respective RFID interrogator to the processing system;

wherein the at least one memory of the processing system is configured to store program instructions that when executed cause the defined boundaries each scan zone for each RFID interrogator to be selectively configured to effect user desired levels of fidelity and/or resolution with respect to the generated unique identifier of each scanned RFID tag within a defined space of the materials handling facility.

2. The adaptive inventory management system of claim 1, wherein the defined boundaries each of scan zone for each RFID interrogator is configured such that boundaries of the respective RFID interrogators do not overlap.

3. The adaptive inventory management system of claim 1, wherein the defined boundaries of each scan zone for each RFID interrogator is user configurable such that at least portions of the defined boundaries of the respective RFID interrogators overlap with at least adjacent or otherwise selected RFID interrogators to define at least one overlapping scan zone, wherein each overlapping scan zone and the associated RFID identifier data therefrom are created from RFID identifier data received from each scan of the respective scan zones of the respective selected RFID interrogators, and wherein the RFID identifier data of the each scanned RFID tag identified within overlapping scan zone is communicated to the processing system.

4. The adaptive inventory management system of claim 1, wherein the scan zones projected by each RFID interrogator are selectively configured to effect user desired levels of fidelity and/or resolution via the use of one or more configurable program options to include at least one of: changing the number of RFID interrogators to change the number of scan zones projected by the RFID interrogators within the defined space of the materials handling facility; changing the use of overlapping scan zones projected by the RFID interrogators within the defined space of the materials handling facility; changing the use of signal strength or phase shifting modalities within respective scan zones projected by the RFID interrogators within the defined space of the materials handling facility; changing the use of steerable antenna technologies in each RFID interrogator to create multiple spaced scan zones generated from each of the RFID interrogators within the defined space of the materials handling facility; or changing the use of steerable antenna technologies in the RFID interrogators within the defined space of the materials handling facility to create multiple overlapping scan zones from each of the RFID interrogators.

5. The adaptive inventory management system of claim 4, wherein user desired levels of fidelity and/or resolution can be selectively increased via the use of one or more configurable program options to include at least one of: increasing the number of RFID interrogators to increase the number of scan zones projected by the RFID interrogators within the defined space of the materials handling facility; increasing the use of overlapping scan zones projected by the RFID interrogators within the defined space of the materials handling facility; increasing the use of signal strength or phase shifting modalities within respective scan zones projected by the RFID interrogators within the defined space of the materials handling facility; increasing the use of steerable antenna technologies in each RFID interrogator to increase the number of created multiple spaced scan zones generated from each of the RFID interrogators within the defined space of the materials handling facility; or increasing the use of steerable antenna technologies in the RFID interrogators within the defined space of the materials handling facility to increase the number of created multiple overlapping scan zones from each of the RFID interrogators.

6. The adaptive inventory management system of claim 4, wherein user desired levels of fidelity and/or resolution can be selectively decreased via the use of one or more configurable program options to include at least one of: decreasing the number of RFID interrogators to decrease the number of scan zones projected by the RFID interrogators within the defined space of the materials handling facility; decreasing the use of overlapping scan zones projected by the RFID interrogators within the defined space of the materials handling facility; decreasing the use of signal strength or phase shifting modalities within respective scan zones projected by the RFID interrogators within the defined space of the materials handling facility; decreasing the use of steerable antenna technologies in each RFID interrogator to decrease the number of created multiple spaced scan zones generated from each of the RFID interrogators within the defined space of the materials handling facility; or decreasing the use of steerable antenna technologies in the RFID interrogators within the defined space of the materials handling facility to decrease the number of created multiple overlapping scan zones from each of the RFID interrogators.

7. The adaptive inventory management system of claim 1, further comprising a plurality of receptacles configured to receive one or more items of the plurality of items, wherein the geospatial location of each of the plurality of receptacles is stored within the at least one memory of the processing system.

8. The adaptive inventory management system of claim 1, wherein the RFID interrogator subsystem further comprises at least one mobile RFID interrogator configured to be operated by a mobile agent of the materials handling facility.

9. The adaptive inventory management system of claim 1, wherein each RFID interrogator is configured to interface with the global inventory database subsystem, which interface can be configured to be wired, wireless, or at least partially wireless.

10. The adaptive inventory management system of claim 1, wherein the RFID interrogator subsystem further comprises at least one hub that is configured to act as a network node, which network node is configured to relay information to and from each RFID interrogator to the global inventory database subsystem.

11. The adaptive inventory management system of claim 1, wherein each of the plurality of fixed RFID interrogators are spaced from each other, and wherein the geospatial location of the plurality of fixed RFID interrogators is stored within the at least one memory of the processing system.

12. The adaptive inventory management system of claim 1, further comprising a plurality of receptacles configured to receive one or more items of the plurality of items, wherein each of the plurality of receptacles is associated with a RFID tag, wherein each RFID tag for each receptacle stores a unique geospatial location identifier; wherein the geospatial location identifier of each of the plurality of receptacles is stored within at least one memory of the processing system, whereby a combination of the known position of the respective fixed plurality of RFID interrogators and the known geospatial position of the respective receptacle mounted RFID tags aid in increasing the fidelity of the geospatial location of inventory items within the materials handling facility.

13. The adaptive inventory management system of claim 1, wherein the unique identifier of each scanned RFID tag comprises at least one of the unique identification code for each scanned item or the geospatial location identifier data associated with each scanned item to include the date and time of a scanning event, whereby the warehouse inventory management system can synchronize data associated with each inventory item received from different RFID interrogators.

14. The adaptive inventory management system of claim 1, further comprising a motion detection subsystem configured to detect movement within a defined region between a first physical zone and a second physical zone, whereby, in response to detecting movement, the processing system instructs the RFID interrogator subsystem to identify inventory items moving from the first physical zone to the second physical zone and to subsequently report to the global inventory database subsystem, the identity of each item identified as having moved allowing the global inventory database subsystem system to update the physical location of each item that transits from the first physical zone to the second physical zone.

15. The adaptive inventory management system of claim 14, wherein the global inventory database subsystem is configured to activate a scan, or to prevent a scan, depending on the need and or event triggered by the motion detection subsystem.

16. The adaptive inventory management system of claim 1, wherein the global inventory database subsystem is configured to activate a scan, or to prevent a scan, on a recurring or otherwise identified timeline or schedule.

17. An adaptive inventory management system, comprising:
a plurality of items positioned within a defined space, wherein each of the plurality of items is associated with a Radio Frequency Identification (RFID) tag, wherein each RFID tag stores a unique identifier;
a global inventory database subsystem having a processing system, wherein an at least one memory of the processing system is configured to store program instructions; and
an RFID interrogator subsystem comprising a plurality of RFID interrogators mounted in respective fixed geospatial locations in the defined space, wherein the plurality of fixed RFID interrogators includes a direct wireless connection between respective RFID interrogators for the sharing of certain data, and wherein each of the RFID interrogators is configured to read the unique identifier of the RFID tag associated with each of the plurality of items that are within a defined boundary of at least one scan zone generated by the respective RFID interrogator, and to communicate the unique identifier of the each scanned RFID tag identified within each scan zone of the respective RFID interrogator to the processing system;

wherein the at least one memory of the processing system is configured to store program instructions that when executed cause the defined boundaries each scan zone for each RFID interrogator to be selectively configured to effect user desired levels of fidelity and/or resolution with respect to the generated unique identifier of the each scanned RFID tag within the defined space, and wherein the scan zones projected by each RFID interrogator are selectively configured to effect user desired levels of fidelity and/or resolution.

18. The adaptive inventory management system of claim 17, wherein the RFID interrogator subsystem further comprises at least one mobile RFID interrogator configured to be operated by a mobile agent.

19. The adaptive inventory management system of claim 17, wherein each of the plurality of fixed RFID interrogators are spaced from each other, and wherein the geospatial location of the plurality of fixed RFID interrogators is stored within the at least one memory of the processing system.

20. The adaptive inventory management system of claim 17, further comprising a motion detection subsystem configured to detect movement within a defined region between a first physical zone and a second physical zone, whereby, in response to detecting movement, the processing system instructs the RFID interrogator subsystem to identify inventory items moving from the first physical zone to the second physical zone and to subsequently report to the global inventory database subsystem, the identity of each item identified as having moved allowing the global inventory database subsystem system to update the physical location of each item that transits from the first physical zone to the second physical zone.

21. The adaptive inventory management system of claim 17, wherein the scan zones projected by each RFID interrogator are selectively configured to effect user desired levels of fidelity and/or resolution via the use of one or more configurable program options to include changing the number of RFID interrogators to change the number of scan zones projected by the RFID interrogators within the defined space.

22. The adaptive inventory management system of claim 17, wherein the scan zones projected by each RFID interrogator are selectively configured to effect user desired levels of fidelity and/or resolution via the use of one or more configurable program options to include changing the use of overlapping scan zones projected by the RFID interrogators within the defined space.

23. The adaptive inventory management system of claim 17, wherein the scan zones projected by each RFID interrogator are selectively configured to effect user desired levels of fidelity and/or resolution via the use of one or more configurable program options to include changing the use of signal strength or phase shifting modalities within respective scan zones projected by the RFID interrogators within the defined space.

24. The adaptive inventory management system of claim 17, wherein the scan zones projected by each RFID interrogator are selectively configured to effect user desired levels of fidelity and/or resolution via the use of one or more configurable program options to include changing the use of steerable antenna technologies in each RFID interrogator to create multiple spaced scan zones generated from each of the RFID interrogators within the defined space.

25. The adaptive inventory management system of claim 17, wherein the scan zones projected by each RFID interrogator are selectively configured to effect user desired levels of fidelity and/or resolution via the use of one or more configurable program options to include changing the use of steerable antenna technologies in the RFID interrogators within the defined space to create multiple overlapping scan zones from each of the RFID interrogators.

26. The adaptive inventory management system of claim 17, wherein the scan zones projected by each RFID interrogator are selectively configured to effect user desired levels of fidelity and/or resolution via the use of one or more configurable program options to include at least one of: changing the number of RFID interrogators to change the number of scan zones projected by the RFID interrogators within the defined space; changing the use of overlapping scan zones projected by the RFID interrogators within the defined space; changing the use of signal strength or phase shifting modalities within respective scan zones projected by the RFID interrogators within the defined space; changing the use of steerable antenna technologies in each RFID interrogator to create multiple spaced scan zones generated from each of the RFID interrogators within the defined space; or changing the use of steerable antenna technologies in the RFID interrogators within the defined space to create multiple overlapping scan zones from each of the RFID interrogators.

27. The adaptive inventory management system of claim 17, wherein the unique identifier of each scanned RFID tag comprises at least one of the unique identification code for each scanned item or the geospatial location identifier data associated with each scanned item to include the date and time of a scanning event, whereby the warehouse inventory management system can synchronize data associated with each inventory item received from different RFID interrogators.

28. The adaptive inventory management system of claim 17, wherein the defined space is in a materials handling facility.

29. An adaptive inventory management system for use in a materials handling facility, comprising:
    a plurality of items, wherein each of the plurality of items is associated with a Radio Frequency Identification (RFID) tag, wherein each RFID tag stores a unique identifier;
    a global inventory database subsystem having a processing system, wherein an at least one memory of the processing system is configured to store program instructions; and
    an RFID interrogator subsystem comprising a plurality of RFID interrogators mounted in respective fixed geospatial locations in the materials handling facility, wherein the plurality of fixed RFID interrogators includes a direct wireless connection between respective RFID interrogators for the sharing of certain data, wherein the RFID interrogator subsystem further comprises at least one mobile RFID interrogator; and wherein each of the RFID interrogators is configured to read the unique identifier of the RFID tag associated with each of the plurality of items that are within a defined boundary of at least one scan zone generated by the respective RFID interrogator, and to communicate the unique identifier of the each scanned RFID tag identified within each scan zone of the respective RFID interrogator to the processing system;

wherein the at least one memory of the processing system is configured to store program instructions that when executed cause the defined boundaries each scan zone for each RFID interrogator to be selectively configured to effect user desired levels of fidelity and/or resolution with respect to the generated unique identifier of each scanned RFID tag within a defined space of the materials handling facility.

30. The adaptive inventory management system of claim 29, wherein each of the plurality of fixed RFID interrogators are spaced from each other, and wherein the geospatial location of the plurality of fixed RFID interrogators is stored within the at least one memory of the processing system.

* * * * *